(12) United States Patent
O'Connor et al.

(10) Patent No.: US 8,041,990 B2
(45) Date of Patent: Oct. 18, 2011

(54) SYSTEM AND METHOD FOR ERROR CORRECTION AND DETECTION IN A MEMORY SYSTEM

(75) Inventors: James A. O'Connor, Ulster Park, NY (US); Luis A. Lastras-Montano, Cortlandt Manor, NY (US); Luis C. Alves, Hopewell Junction, NY (US); William J. Clarke, Poughkeepsie, NY (US); Timothy J. Dell, Colchester, VT (US); Thomas J. Dewkett, Staatsburg, NY (US); Kevin C. Gower, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 11/769,929

(22) Filed: Jun. 28, 2007

(65) Prior Publication Data
US 2009/0006886 A1 Jan. 1, 2009

(51) Int. Cl.
*G06F 11/00* (2006.01)
(52) U.S. Cl. .......... 714/6.22; 714/6.24; 714/25; 714/42; 714/48
(58) Field of Classification Search ............ 714/1–57, 714/100, 763; 711/154; 348/143; 710/22; 706/52; 371/140.1
See application file for complete search history.

(56) References Cited

U.S. PATENT DOCUMENTS

| | | | |
|---|---|---|---|
| 5,124,948 A | 6/1992 | Takizawa et al. | |
| 5,163,023 A | 11/1992 | Ferris et al. | |
| 5,272,671 A | 12/1993 | Kudo | |
| 5,463,643 A | 10/1995 | Gaskins | |
| 5,488,691 A | 1/1996 | Fuoco | |
| 5,499,253 A * | 3/1996 | Lary | 714/770 |
| 5,513,135 A | 4/1996 | Dell et al. | |
| 5,537,665 A | 7/1996 | Patel et al. | |
| 5,680,564 A | 10/1997 | Divivier | |
| 6,012,839 A | 1/2000 | Nguyen | |
| 6,332,206 B1 * | 12/2001 | Nakatsuji et al. | 714/755 |
| 6,381,685 B2 | 4/2002 | Dell et al. | |
| 6,418,068 B1 | 7/2002 | Raynham | |
| 6,442,726 B1 * | 8/2002 | Knefel | 714/763 |
| 6,715,116 B2 | 3/2004 | Lester et al. | |

(Continued)

FOREIGN PATENT DOCUMENTS
JP 11144491 A2 5/1999
(Continued)

OTHER PUBLICATIONS

Chen, Peter M. et al, "RAID: High-Performance, Reliable Secondary Storage", ACM Computing Surveys, ACM, New York, NY, US, vol. 26, No. 2, Jun. 1, 1994, pp. 145-185.

(Continued)

*Primary Examiner* — Scott Baderman
*Assistant Examiner* — Sarai Butler
(74) *Attorney, Agent, or Firm* — Cantor Colburn LLP

(57) ABSTRACT

A system and method for error correction and detection in a memory system. The system includes a memory controller, a plurality of memory modules and a mechanism. The memory modules are in communication with the memory controller and with a plurality of memory devices. The mechanism detects that one of the memory modules has failed possibly coincident with a memory device failure on an other of the memory modules. The mechanism allows the memory system to continue to run unimpaired in the presence of the memory module failure and the memory device failure.

25 Claims, 17 Drawing Sheets

U.S. PATENT DOCUMENTS

| | | | |
|---|---|---|---|
| 6,763,444 B2 | 7/2004 | Thomann | |
| 6,820,072 B1 * | 11/2004 | Skaanning et al. | 706/52 |
| 6,845,472 B2 | 1/2005 | Walker et al. | |
| 6,845,474 B2 | 1/2005 | Walker et al. | |
| 6,854,070 B2 | 2/2005 | Johnson et al. | |
| 6,973,612 B1 | 12/2005 | Rodi | |
| 6,988,219 B2 | 1/2006 | Hitz et al. | |
| 7,055,054 B2 | 5/2006 | Olarig | |
| 7,099,994 B2 * | 8/2006 | Thayer et al. | 711/114 |
| 7,149,945 B2 | 12/2006 | Brueggen | |
| 7,191,257 B2 * | 3/2007 | Ali Khan et al. | 710/22 |
| 7,200,780 B2 * | 4/2007 | Kushida | 714/52 |
| 7,320,086 B2 | 1/2008 | Majni et al. | |
| 7,409,581 B2 | 8/2008 | Santeler et al. | |
| 7,484,138 B2 | 1/2009 | Hsieh et al. | |
| 7,752,490 B2 * | 7/2010 | Abe | 714/7 |
| 2003/0002358 A1 | 1/2003 | Lee et al. | |
| 2003/0023930 A1 | 1/2003 | Fujiwara et al. | |
| 2003/0208704 A1 | 11/2003 | Bartels et al. | |
| 2004/0034818 A1 * | 2/2004 | Gross et al. | 714/42 |
| 2004/0123223 A1 | 6/2004 | Halford | |
| 2004/0168101 A1 | 8/2004 | Kubo | |
| 2005/0108594 A1 | 5/2005 | Menon et al. | |
| 2005/0204264 A1 | 9/2005 | Yusa | |
| 2006/0156190 A1 * | 7/2006 | Finkelstein et al. | 714/763 |
| 2006/0244827 A1 * | 11/2006 | Moya et al. | 348/143 |
| 2006/0248406 A1 | 11/2006 | Qing et al. | |
| 2006/0282745 A1 | 12/2006 | Joseph et al. | |
| 2007/0047344 A1 * | 3/2007 | Thayer et al. | 365/201 |
| 2007/0050688 A1 * | 3/2007 | Thayer | 714/100 |
| 2007/0101094 A1 * | 5/2007 | Thayer et al. | 711/202 |
| 2007/0192667 A1 | 8/2007 | Nieto et al. | |
| 2007/0260623 A1 | 11/2007 | Jaquette et al. | |
| 2008/0010435 A1 | 1/2008 | Smith et al. | |
| 2008/0163385 A1 | 7/2008 | Mahmoud | |
| 2008/0168329 A1 | 7/2008 | Han | |
| 2008/0222449 A1 * | 9/2008 | Ramgarajan et al. | 714/6 |
| 2008/0250270 A1 | 10/2008 | Bennett | |
| 2008/0266999 A1 * | 10/2008 | Thayer | 365/230.03 |
| 2009/0006886 A1 | 1/2009 | O'Connor et al. | |
| 2009/1000690 | 1/2009 | Lastras-Montano | |

FOREIGN PATENT DOCUMENTS

| | | |
|---|---|---|
| WO | 2006029243 A1 | 3/2006 |

OTHER PUBLICATIONS

"The RAIDBook—A Source Book for RAID Technology" by The RAID Advisory Board, Lino Lakes, MN, Jun. 9, 1993—XP002928115.

D. Wortzman; "Two-Tier Error Correcting Code for Memories"; vol. 26, #10, pp. 5314-5318; Mar. 1984.

U.S. Appl. No. 11/769,936, filed Jun. 28, 2007. "System and Method for Providing a High Fault Tolerant Memory System". Luis A. Lastras-Montano, et al. 59 pgs and figures (7 sheets).

L.A. Lastras-Montano; "A new class of array codes for memory storage"; Version—Jan. 19, 2011.

System Z GF (65536) x8 RAIM Code—Mar. 12, 2010, pp. 1-22.

* cited by examiner

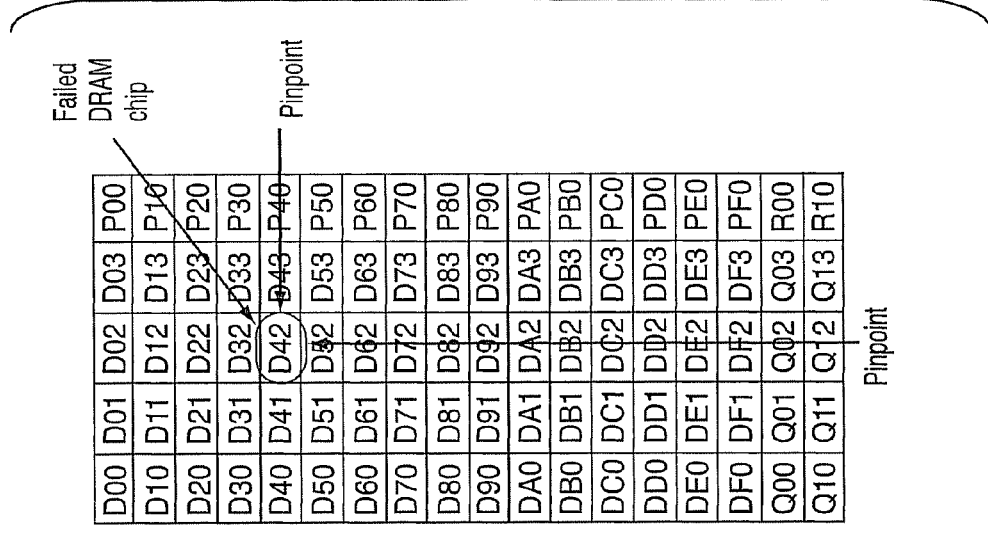
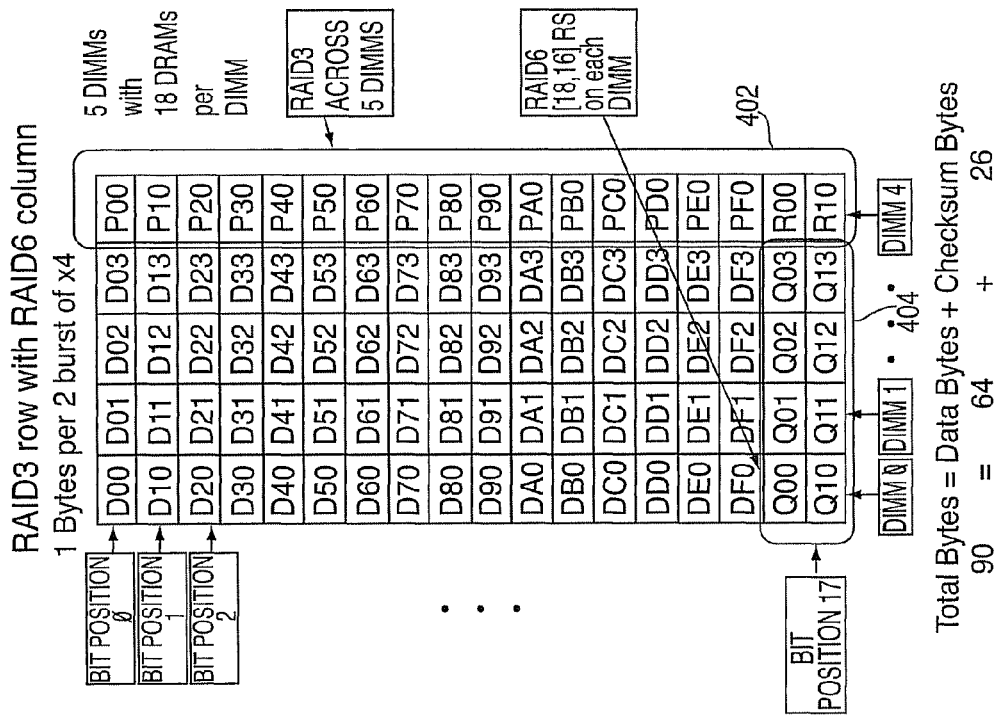
FIG. 4

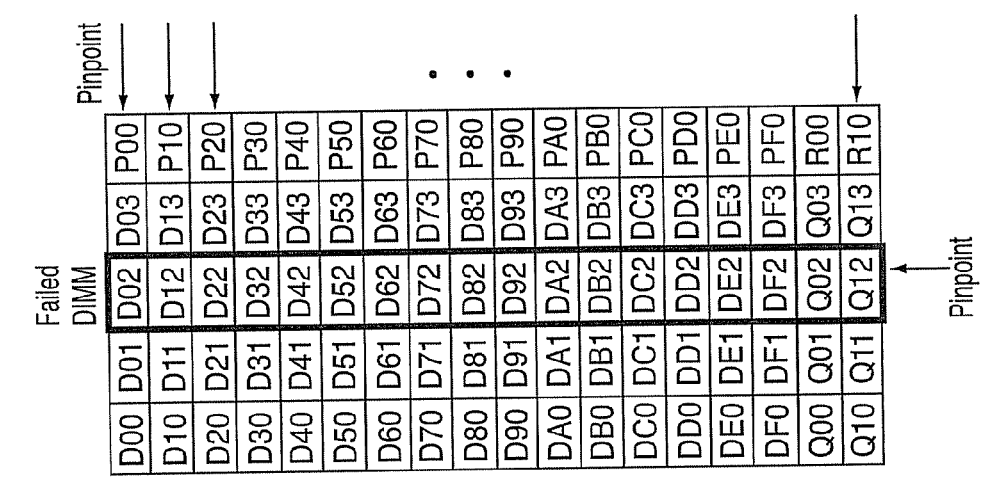
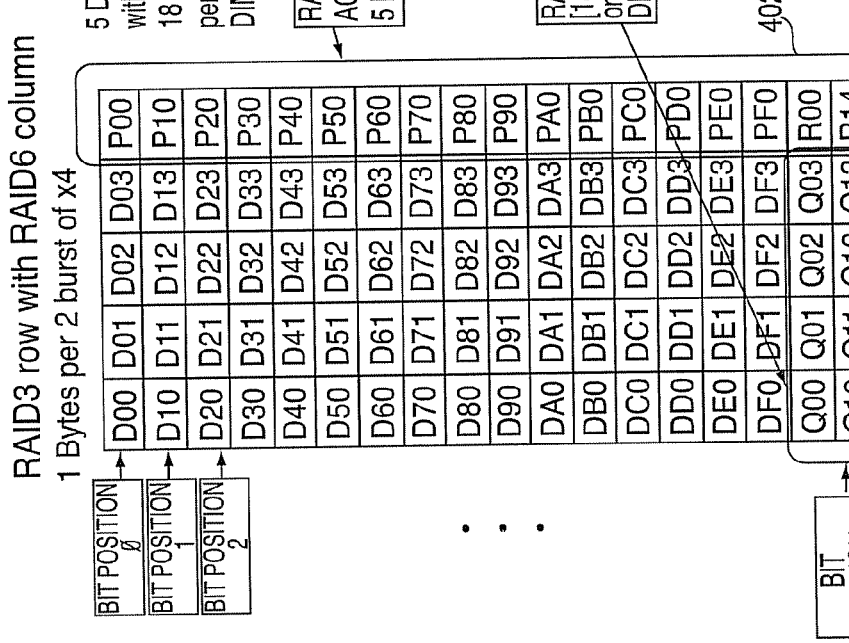
FIG. 5

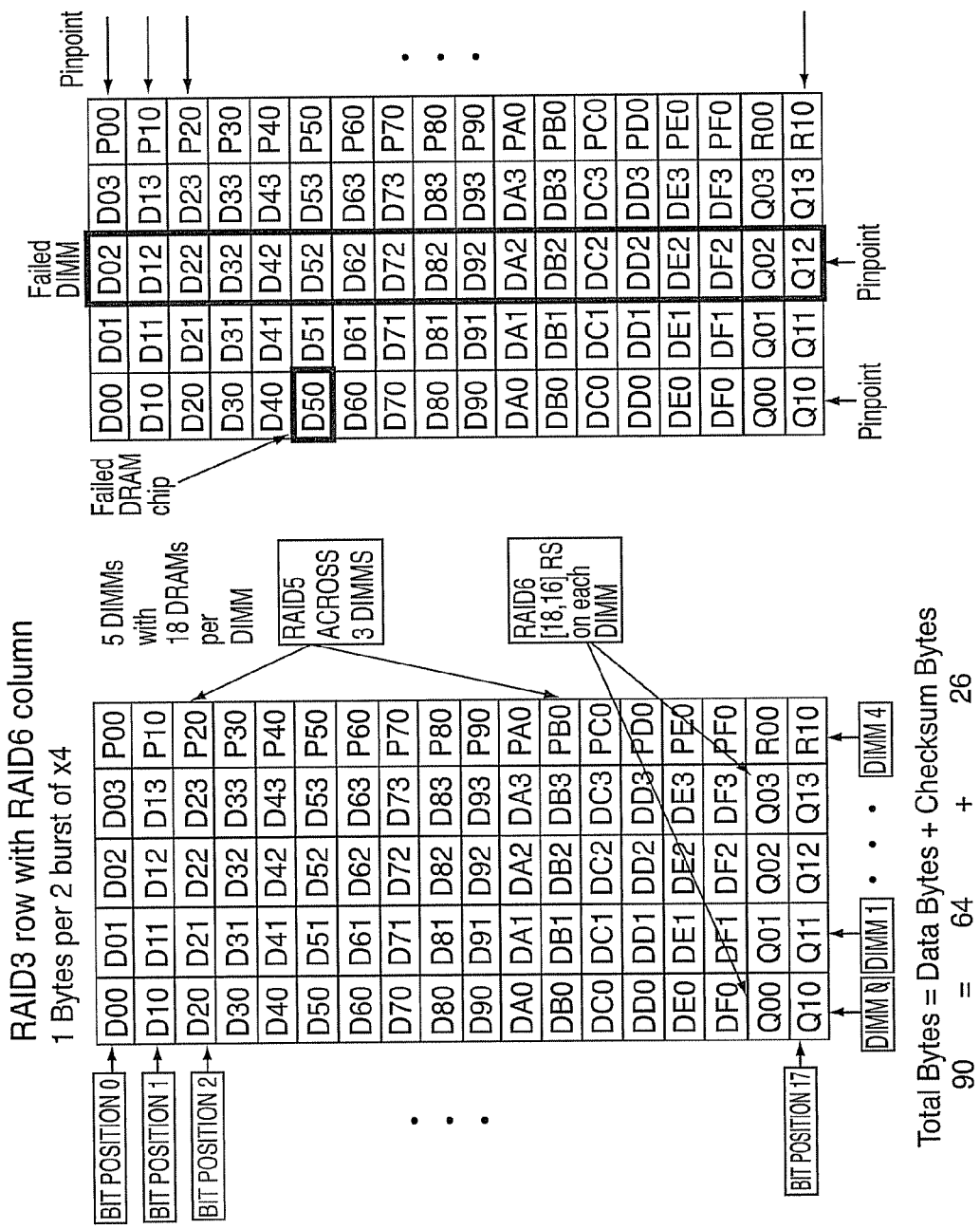

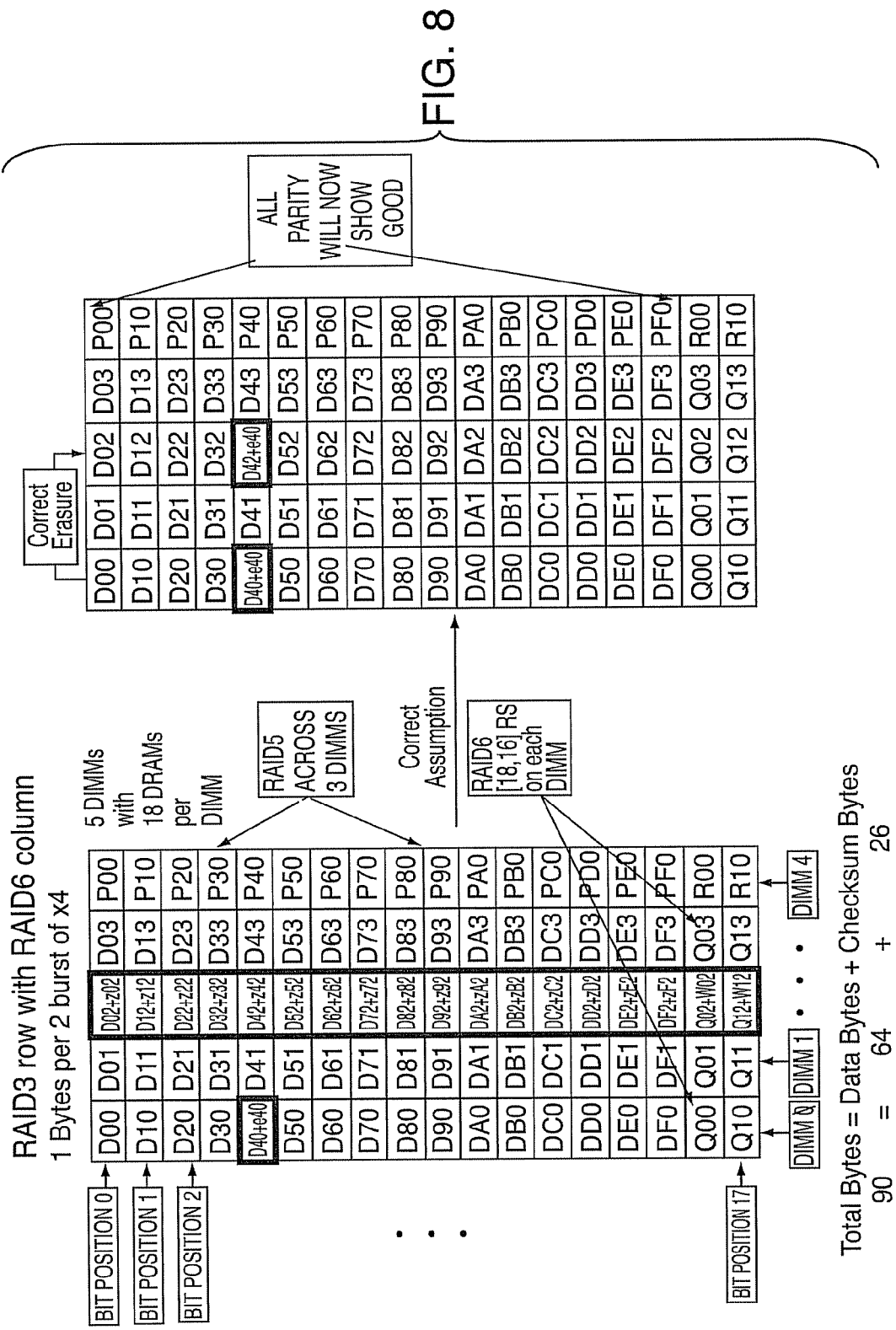

| Number of errors non-zero syndromes | | | Valid Correctable Errors Signatures | Pinning Improvment | State |
|---|---|---|---|---|---|
| Px | Q0y | Q1y | | | |
| 1 | 1 | 1 | Valid Single Data Symbol Error Signature (1 row & 1 column) | | SD1 |
| 2 | 2 | 2 | Valid Double Data Symbol Error Signature (2 rows & 2 columns) | Yes | SD2 |
| 1 | 2 | 2 | Valid Double Data Symbol Error Signature (1 row & 2 columns) | Yes | SD3 |
| 2 | 1 | 1 | Valid Double Data Symbol Error Signature (2 rows & 1 column) | Yes | SD4 |
| >2 | 1 | 1 | Valid Single DIMM Error Signature (All rows & 1 column) | | SD5 |
| >2 | 2 | 2 | Valid Single DIMM Error Signature + another symbol (Up to All rows & 2 Columns) | Yes | SD6 |
| | | | | | |
| 1 | | | Valid Single Checksum Error Signature | | SE1 |
| | 1 | | Valid Single Checksum Error Signature | | SE1 |
| | | 1 | Valid Single Checksum Error Signature | | SE1 |
| 1 | 1 | | Valid Double Checksum Error Signature | Yes | SE2 |
| 1 | | 1 | Valid Double Checksum Error Signature | Yes | SE2 |

FIG. 13

SYSTEM AND METHOD FOR ERROR CORRECTION AND DETECTION IN A MEMORY SYSTEM

CROSS-REFERENCE TO RELATED APPLICATIONS

This application contains subject matter that is related to the subject matter of a co-pending application entitled "System and Method for Providing a High Fault Tolerant Memory System" Ser. No. 11/769,936 filed contemporaneously with the present application, assigned to the same assignee as this application, and hereby incorporated by reference in its entirety.

BACKGROUND OF THE INVENTION

This invention relates generally to computer memory, and more particularly to error detection and correction in a RAID memory system.

Computer systems often require a considerable amount of high speed RAM (random access memory) to hold information such as operating system software, programs and other data while a computer is powered on and operational. This information is normally binary, composed of patterns of 1's and 0's known as bits of data. The bits of data are often grouped and organized at a higher level. A byte, for example, is typically composed of 8 bits, although it may be composed of additional bits (e.g. 9, 10, etc.) when the byte also includes information for use in the identification and/or correction of errors. This binary information is normally loaded into RAM from nonvolatile storage (NVS) such as hard disk drives (HDDs) during power on and initial program load (IPL) of the computer system. The data is also paged-in from and paged-out to NVS during normal computer operation. In general, all the programs and information utilized by a computer system cannot fit in the smaller, more costly dynamic RAM (DRAM), and even if it did fit, the data would be lost when the computer system is powered off. At present, it is common for NVS systems to be built using a large number of HDDs.

Computer RAM is often designed with pluggable subsystems, often in the form of modules, so that incremental amounts of RAM can be added to each computer, dictated by the specific memory requirements for each system and application. The acronym, "DIMM" refers to dual in-line memory modules, which are perhaps the most prevalent memory module currently in use. A DIMM is a thin rectangular card comprising one or more memory devices, and may also include one or more of registers, buffers, hub devices, and/or non-volatile storage (e.g., erasable programmable read only memory or "EPROM") as well as various passive devices (e.g. resistors and capacitors), all mounted to the card. DIMMs are often designed with dynamic memory chips or DRAMs that need to be regularly refreshed to prevent the data stored within them from being lost. Originally, DRAM chips were asynchronous devices, however contemporary chips, synchronous DRAM (SDRAM) (e.g. single data rate or "SDR", double data rate or "DDR", DDR2, DDR3, etc) have synchronous interfaces to improve performance. DDR devices are available that use pre-fetching along with other speed enhancements to improve memory bandwidth and to reduce latency. DDR3, for example, has a standard burst length of 8.

Memory device densities have continued to grow as computer systems have become more powerful. Currently it is not uncommon to have the RAM content of a single computer be composed of hundreds of trillions of bits. Unfortunately, the failure of just a portion of a single RAM device can cause the entire computer system to fail. When memory errors occur, which may be "hard" (repeating) or "soft" (one-time or intermittent) failures, these failures may occur as single cell, multi-bit, full chip or full DIMM failures and all or part of the system RAM may be unusable until it is repaired. Repair turn-around-times can be hours or even days, which can have a substantial impact to a business dependent on the computer systems.

The probability of encountering a RAM failure during normal operations has continued to increase as the amount of memory storage in contemporary computers continues to grow.

Techniques to detect and correct bit errors have evolved into an elaborate science over the past several decades. Perhaps the most basic detection technique is the generation of odd or even parity where the number of 1's or 0's in a data word are "exclusive or-ed" (XOR-ed) together to produce a parity bit. For example, a data word with an even number of 1's will have a parity bit of 0 and a data word with an odd number of 1's will have a parity bit of 1, with this parity bit data appended to the stored memory data. If there is a single error present in the data word during a read operation, it can be detected by regenerating parity from the data and then checking to see that it matches the stored (originally generated) parity.

Richard Hamming recognized that the parity technique could be extended to not only detect errors, but correct errors by appending an XOR field, an error correction code (ECC) field, to each code word. The ECC field is a combination of different bits in the word XOR-ed together so that errors (small changes to the data word) can be easily detected, pinpointed and corrected. The number of errors that can be detected and corrected are directly related to the length of the ECC field appended to the data word. The technique includes ensuring a minimum separation distance between valid data words and code word combinations. The greater the number of errors desired to be detected and corrected, the longer the code word, thus creating a greater distance between valid code words. The smallest distance between valid code words is known as the minimum Hamming distance.

These error detection and error correction techniques are commonly used to restore data to its original/correct form in noisy communication transmission media or for storage media where there is a finite probability of data errors due to the physical characteristics of the device. The memory devices generally store data as voltage levels representing a 1 or a 0 in RAM and are subject to both device failure and state changes due to high energy cosmic rays and alpha particles. Similarly, HDDs that store 1's and 0's as magnetic fields on a magnetic surface are also subject to imperfections in the magnetic media and other mechanisms that can cause changes in the data pattern from what was originally stored.

In the 1980's, RAM memory device sizes first reached the point where they became sensitive to alpha particle hits and cosmic rays causing memory bits to flip. These particles do not damage the device but can create memory errors. These are known as soft errors, and most often affect just a single bit. Once identified, the bit failure can be corrected by simply rewriting the memory location. The frequency of soft errors has grown to the point that it has a noticeable impact on overall system reliability.

Memory ECCs, like those proposed by Hamming, use a combination of parity codes in various bit positions of the data word to allow detection and correction of errors. Every time data words are written into memory, a new ECC word needs to be generated and stored with the data, thereby allowing detection and correction of the data in cases where the data read out of memory includes an ECC code that does not match a newly calculated ECC code generated from the data being read.

The first ECCs were applied to RAM in computer systems in an effort to increase fault-tolerance beyond that allowed by previous means. Binary ECC codes were deployed that allowed for double-bit error detection (DED) and single-bit error correction (SEC). This SEC/DED ECC also allows for transparent recovery of single bit hard errors in RAM.

Scrubbing routines were also developed to help reduce memory errors by locating soft errors through a complement/re-complement process so that the soft errors could be detected and corrected.

Some storage manufacturers have used advanced ECC techniques, such as Reed-Solomon codes, to correct for full memory chip failures. Some memory system designs also have standard reserve memory chips (e.g. "spare" chips) that can be automatically introduced in a memory system to replace a faulty chip. These advancements have greatly improved RAM reliability, but as memory size continues to grow and customers' reliability expectations increase, further enhancements are needed. There is the need for systems to survive a complete DIMM failure and for the DIMM to be replaced concurrent with system operation. In addition, other failure modes must be considered which affect single points of failure between the connection between one or more DIMMs and the memory controller/embedded processor. For example, some of the connections between the memory controller and the memory device(s) may include one or more intermediate buffer(s) that may be external to the memory controller and reside on or separate from the DIMM, however upon its failure, may have the effect of appearing as a portion of a single DIMM failure, a full DIMM failure, or a broader memory system failure.

Although there is a clear need to improve computer RAM reliability (also referred to as "fault tolerance") by using even more advanced error correction techniques, attempts to do this have been hampered by impacts to available customer memory, performance, space, heat, etc. Using redundancy by including extra copies (e.g. "mirroring") of data or more sophisticated error coding techniques drives up costs, adds complexity to the design, and may impact another key business measure: time-to-market. For example, the simple approach of memory mirroring has been offered as a feature by several storage manufacturing companies. The use of memory mirroring permits systems to survive more catastrophic memory failures, but acceptance has been very low because it generally requires a doubling of the memory size on top of the base SEC/DEC ECC already present in the design, which generally leaves customers with less than 50% of the installed RAM available for system use.

ECC techniques have been used to improve availability of storage systems by correcting HDD failures so that customers do not experience data loss or data integrity issues due to failure of an HDD, while further protecting them from more subtle failure modes.

Some suppliers of storage systems have used redundant array of independent disks (RAID) techniques successfully to improve availability of HDDs to computer RAM. In many respects it is easier to recover from a HDD failure using RAID techniques because it is much easier to isolate the failure in HDDs than it is in RAM. HDDs often have embedded checkers such as ECCs to detect bad sectors. In addition, cyclic redundancy checks (CRCs) and longitudinal redundancy checks (LRCs) may be embedded in HDD electronics or disk adapters, or they may be checkers used by higher levels of code and applications to detect HDD errors. CRCs and LRCs are written coincident with data to help detect data errors. CRCs and LRCs are hashing functions used to produce a small substantially unique bit pattern generated from the data. When the data is read from the HDD, the check sum is regenerated and compared to that stored on the platter. The signatures must match exactly to ensure the data retrieved from the magnetic pattern encoded on the disk is as was originally written to the disk.

RAID systems have been developed to improve performance and/or to increase the availability of disk storage systems. RAID distributes data across several independent HDDs. There are many different RAID schemes that have been developed each having different characteristics, and different pros and cons associated with them. Performance, availability, and utilization/efficiency (the percentage of the disks that actually hold customer data) are perhaps the most important. The tradeoffs associated with various schemes have to be carefully considered because improvements in one attribute can often result in reductions in another.

RAID-0 is striping of data across multiple HDDs to improve performance. RAID-1 is mirroring of data, keeping 2 exact copies of the data on 2 different HDDs to improve availability and prevent data loss. Some RAID schemes can be used together to gain combined benefits. For example, RAID-10 is both data striping and mirroring across several HDDs in an array to improve both performance and availability.

RAID-3, RAID-4 and RAID-5 are very similar in that they use a single XOR check sum to correct for a single data element error. RAID-3 is byte-level striping with dedicated parity HDD. RAID-4 uses block level striping with a dedicated parity HDD. RAID-5 is block level striping like RAID-4, but with distributed parity. There is no longer a dedicated parity HDD. Parity is distributed substantially uniformly across all the HDDs, thus eliminating the dedicated parity HDD as a performance bottleneck. The key attribute of RAID-3, RAID-4 and RAID-5 is that they can correct a single data element fault when the location of the fault can be pinpointed through some independent means.

There is not a single universally accepted industry-wide definition for RAID-6. In general, RAID-6 refers to block or byte-level striping with dual checksums. An important attribute of RAID-6 is that it allow for correction of up to 2 data element faults when the faults can be pinpointed through some independent means. It also has the ability to pinpoint and correct a single failure when the location of the failure is not known.

FIG. 1 depicts a contemporary system composed of an integrated processor chip 100, which contains one or more processor elements and an integrated memory controller 110. In the configuration depicted in FIG. 1, multiple independent cascade interconnected memory interface busses 106 are logically aggregated together to operate in unison to support a single independent access request at a higher bandwidth with data and error detection/correction information distributed or "striped" across the parallel busses and associated devices. The memory controller 110 attaches to four narrow/high speed point-to-point memory busses 106, with each bus 106 connecting one of the several unique memory controller interface channels to a cascade interconnect memory subsystem 103 (or memory module, e.g., a DIMM) which includes at least a hub device 104 and one or more memory devices 109. Some systems further enable operations when a subset of the memory busses 106 are populated with memory subsystems 103. In this case, the one or more populated memory busses 108 may operate in unison to support a single access request.

FIG. 2 depicts a memory structure with cascaded memory modules 103 and unidirectional busses 106. One of the functions provided by the hub devices 104 in the memory modules 103 in the cascade structure is a re-drive function to send signals on the unidirectional busses 106 to other memory modules 103 or to the memory controller 110. FIG. 2 includes the memory controller 110 and four memory modules 103, on each of two memory busses 106 (a downstream memory bus with 24 wires and an upstream memory bus with 25 wires), connected to the memory controller 110 in either a direct or cascaded manner. The memory module 103 next to the memory controller 110 is connected to the memory controller 110 in a direct manner. The other memory modules 103 are connected to the memory controller 110 in a cascaded manner. Although not shown in this figure, the memory controller 110 may be integrated in the processor 100 and may connect to more than one memory bus 106 as depicted in FIG. 1.

There is a need in the art to improve failure detection and correction in memory systems. It would be desirable for a memory system to be able to survive a complete DIMM failure and for the DIMM to be replaced concurrent with system operation.

BRIEF SUMMARY OF THE INVENTION

An exemplary embodiment includes a memory system having a memory controller, a plurality of memory modules and a mechanism. The memory modules are in communication with the memory controller and with a plurality of memory devices. The mechanism detects that that one of the memory modules has failed possibly coincident with a memory device failure on an other of the memory modules. The mechanism allows the memory system to continue to run unimpaired in the presence of the memory module failure and the memory device failure.

Another exemplary embodiment includes a memory controller having an interface to a plurality of memory modules and a mechanism. The memory modules are in communication with a plurality of memory devices. The mechanism detects that one of the memory modules has failed possibly coincident with a memory device failure on an other of the memory modules. The mechanism allows the memory system to continue to run unimpaired in the presence of the memory module failure and the memory device failure.

A further exemplary embodiment includes a method for detecting and correcting errors in a memory system. The method includes detecting one or more errors in the memory system. The memory system includes a plurality of memory modules having memory devices, with the memory modules being accessed in unison in response to memory commands. The method also includes identifying the type of errors using triangulation to isolate the one or more errors to one or both of a memory device and a memory module. The one or more errors are corrected using a first ECC code applied horizontally to memory devices in multiple memory modules and a second ECC code applied vertically to memory devices in a memory module. The memory system is enabled to run unimpaired in the presence of a memory module failure coincident with a memory device failure.

BRIEF DESCRIPTION OF THE DRAWINGS

Referring now to the drawings wherein like elements are numbered alike in the several FIGURES:

FIG. 4 is a block diagram of a logical view of correcting a single DRAM chip error;

FIG. 5 is a block diagram of a logical view of correcting up to a full DIMM failure;

FIG. 7 is a block diagram of a logical view of the difficulty in correcting a full DIMM failure coincident with a secondary DRAM chip failure;

FIG. 8 is a block diagram of a logical view of the difficulty in correcting a full DIMM failure coincident with a secondary DRAM chip failure;

FIG. 13 is a table summarizing the error classifications utilized by exemplary embodiments of the present invention.

DETAILED DESCRIPTION OF EXEMPLARY EMBODIMENTS

Figure 1:
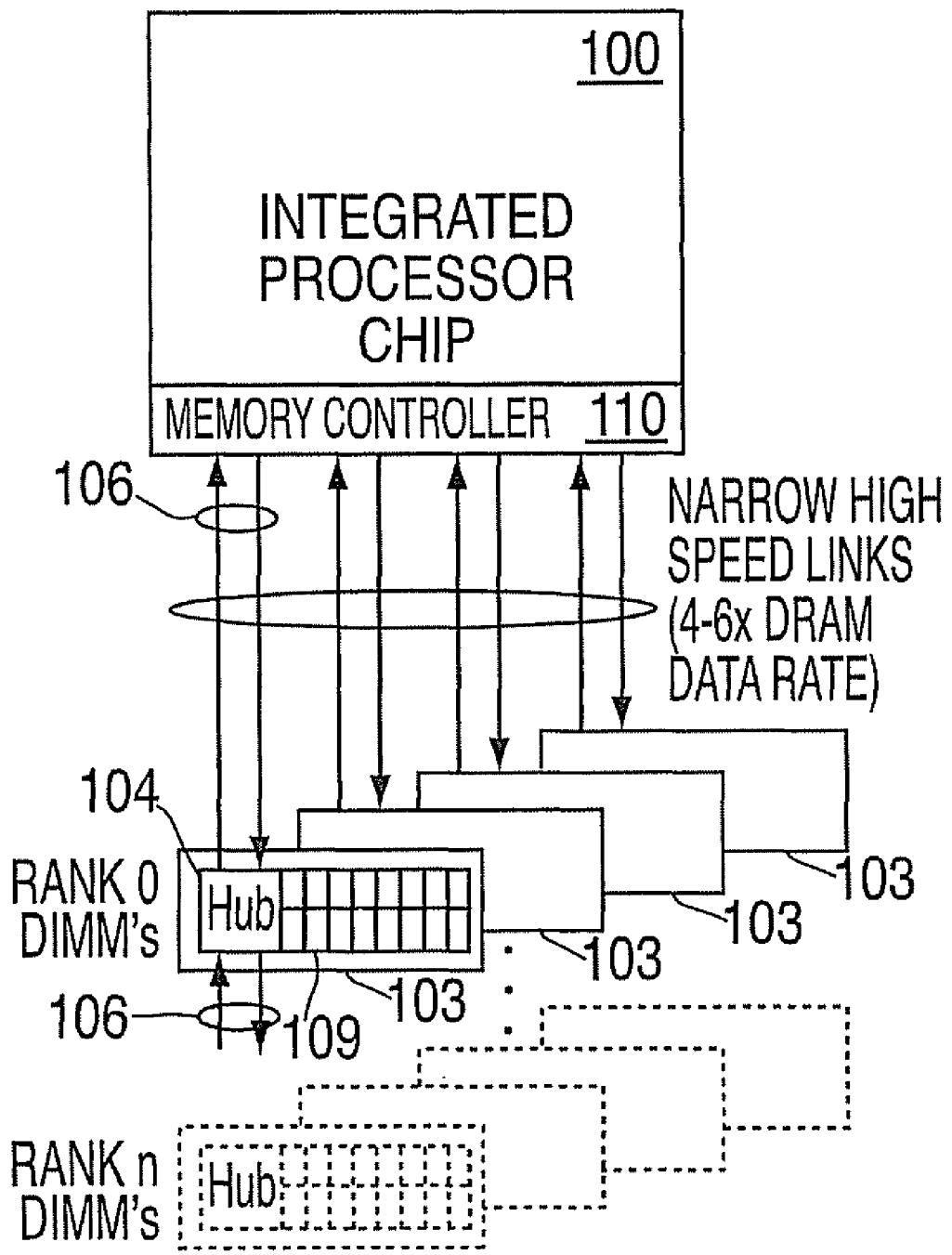
FIG. 1 depicts a cascade interconnect memory system with unidirectional busses.
Figure 2:
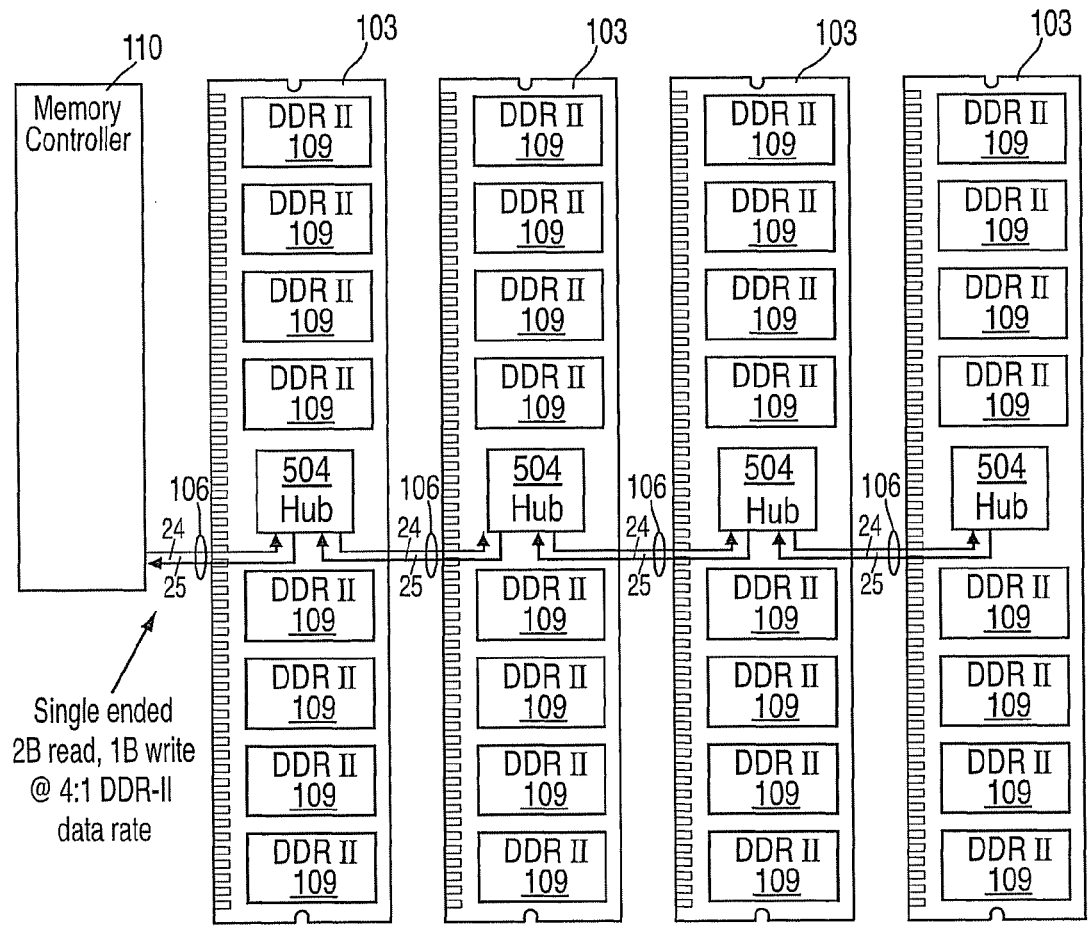
FIG. 2 depicts a cascade interconnect memory system with unidirectional busses.

An exemplary embodiment of the present invention utilizes two independent codes (one applied horizontally and one applied vertically to sections of RAM) to detect and correct up to a full DIMM failure coincident with up to a full chip (e.g., DRAM) failure. This allows for concurrent repair of the failed DIMM and permits continued operation of the computer system memory during repair, even in the presence of a secondary chip error. This ability to handle a secondary chip error is novel and critically important, since there is a finite probability of the occurrence of a secondary error, especially a memory soft error, before the DIMM repair can be accomplished.

As used herein, the term coincident refers to the occurrence of two (or more) error patterns. In one example, a correctable error occurs and then later in time, before the first correctable error can be repaired, a second failure occurs. The first and second failure are said to be coincident. Repair times are always greater than zero and the longer the repair time, the more likely it would be to have a second failure occur coincident with a the first. Before a failing DIMM failure is identified, exemplary embodiments provide for correction of a DIMM failure and up to an additional chip error with high probability. Once a DIMM failure is identified, the exemplary embodiments of the present invention provide correction of a DIMM failure and an additional chip error 100% of the time. Although the words "DIMM failure" or "memory module failure" are utilized herein, the failure modes that exemplary embodiments of the present invention protect against generally include failures of the communication medium that conveys the data from the DIMMs to the memory controller.

Exemplary embodiments provide transparent recovery and full on-line concurrent DIMM repair for computer memory systems comprised of RAM devices (e.g., DRAM, SDRAM, etc.). Transparent recovery for up to a complete memory subsystem (e.g., a DIMM) failure coincident with another memory chip failure is provided. Exemplary embodiments utilize a node structure for the computer system RAM in conjunction with an innovative application of ECC that enables any memory node to be powered down without loss of access to the required system data stored in RAM. As such, the computer system memory continues to run unimpaired, providing full access to all data stored in RAM, just as if all the memory nodes are present, powered-on and fully operational. As used herein, the term memory node refers to the collection of all DIMMS associated with a single logical column. A logical column contains symbols associated with a single symbol position within a strip. In exemplary embodiments described herein, these are the single symbol of the RAID-3 ECC code. Often, but not always, a single column is associated with a single memory channel. The importance of structuring the node in the manner described herein is to provide the ability for the ECC code to regenerate all the missing symbols when the node is removed from the system.

In an exemplary embodiment, "double data rate 3" (DDR3) SDRAM chips are utilized. DIMMs are designed using the DDR3 SDRAM chips, with each chip containing an equal portion of the total data stored on the DIMM. This exemplary embodiment further uses DDR3 devices organized as having four input/output pins (e.g. ×4 devices), where each access has a burst-length of 8. In other words for each memory access, each SDRAM provides 4 bits (1 nibble) of data in bursts of 8, yielding a total of 32 bits or 4 bytes (4 bits×8 burst-length=32 bits=4 bytes).

There is some inconsistency and ambiguity in RAID-related terminology used throughout the industry. The following definitions are what is implied by use of these terms in this disclosure unless otherwise stated. An array is a collection of hard disk drives in which one or more instances of a RAID erasure code is implemented. A symbol or an element is a fundamental unit of data or parity, the building block of the erasure codes. In coding theory this is the data assigned to a bit within the symbol. This is typically a set of sequential sectors. An element is composed of a fixed number of bytes. It is also common to define elements as a fixed number of blocks. A block is a fixed number of bytes. A stripe is a complete and connected set of data and parity elements that are dependently related to the parity computation relations. In coding theory the stripe is the code word or code instance. A strip is a collection of contiguous elements on a single hard disk drive. A strip contains data elements, parity elements or both from the same disk and stripe. The term strip and column are used interchangeably. In coding theory, the strip is associated with the code word and is sometime called the stripe unit. The set of strips in a code word form a stripe. It is most common for strips to contain the same number of elements. In some cases stripes may be grouped together to form a higher level construct know as a stride.

RAID-6 is a specific example of the more general RS error correction codes. RS-codes first surfaced when Irving Reed and Gus Solomon published their paper in 1960. These powerful codes have found wide-ranging use correcting errors ranging from deep space problems to disk errors in DVD players. RS-codes are non-binary cyclic codes applied to data elements or symbols. An RS(n,k) code may be defined to have: k=the number of data symbols, m=symbol length in bits, and n=the total number of symbols. Thus, $0 < k < n < 2^{(m+1)}$.

Further defining c=symbol error correcting capability when the location is not determined independently, results in: n−k=2c. In other words, the difference in the total number of symbols and the number of data symbols is directly proportional to the data correcting capability of the RS-code. RS-codes achieve the largest possible minimum distance for any linear code. For non-binary codes, the minimum distance analogous to the Hamming distance is given by: dmin=n−k+1.

Further defining e=erasure correcting capability (i.e., the ability to correct for faults when the fault location is determined independently), results in e=dmin−1=n−k=2c. In other words it is possible to correct for half as many faults when the location is not known as compared to when the location is determined through some independent means.

R-S codes use a series of simultaneous equations to solve for unknowns. These unknowns are either data symbols or the location of the symbols with the fault. For example, RAID-6 uses 2 equations to generate 2 independent checksums that are applied to each data element in each row. Defining: Q(x)= R−S checksum where x=a; P(x)=R−S checksum where x=1; and d0, d1, . . . , dN=polynomial coefficients, allows the R-S checksum equations to be expressed in polynomial form as: $Q(x)=d0+d1*x+d2*x^2+ \ldots d(N-1)*x^{(N-1)}$. This equation can be used to solve for a coefficient, to correct a data element, and/or if the location of the fault is unknown it can be used to solve for the power of x to pinpoint the location.

It can be seen that the RAID-3, RAID-4 and RAID-5 simple XOR is a special case where of the polynomial sum where x=1 so that the equation then becomes: $P(x)=d0+d1+d2+ \ldots d(N-1)$. There are many variations of this general equation that may be utilized by exemplary embodiments of the present invention. The main requirement is that it be a primitive polynomial, which means that it is analogous to a prime number where it has no common roots. This ensures that the solutions are always unique for a finite field, a Galois field.

Figure 3:
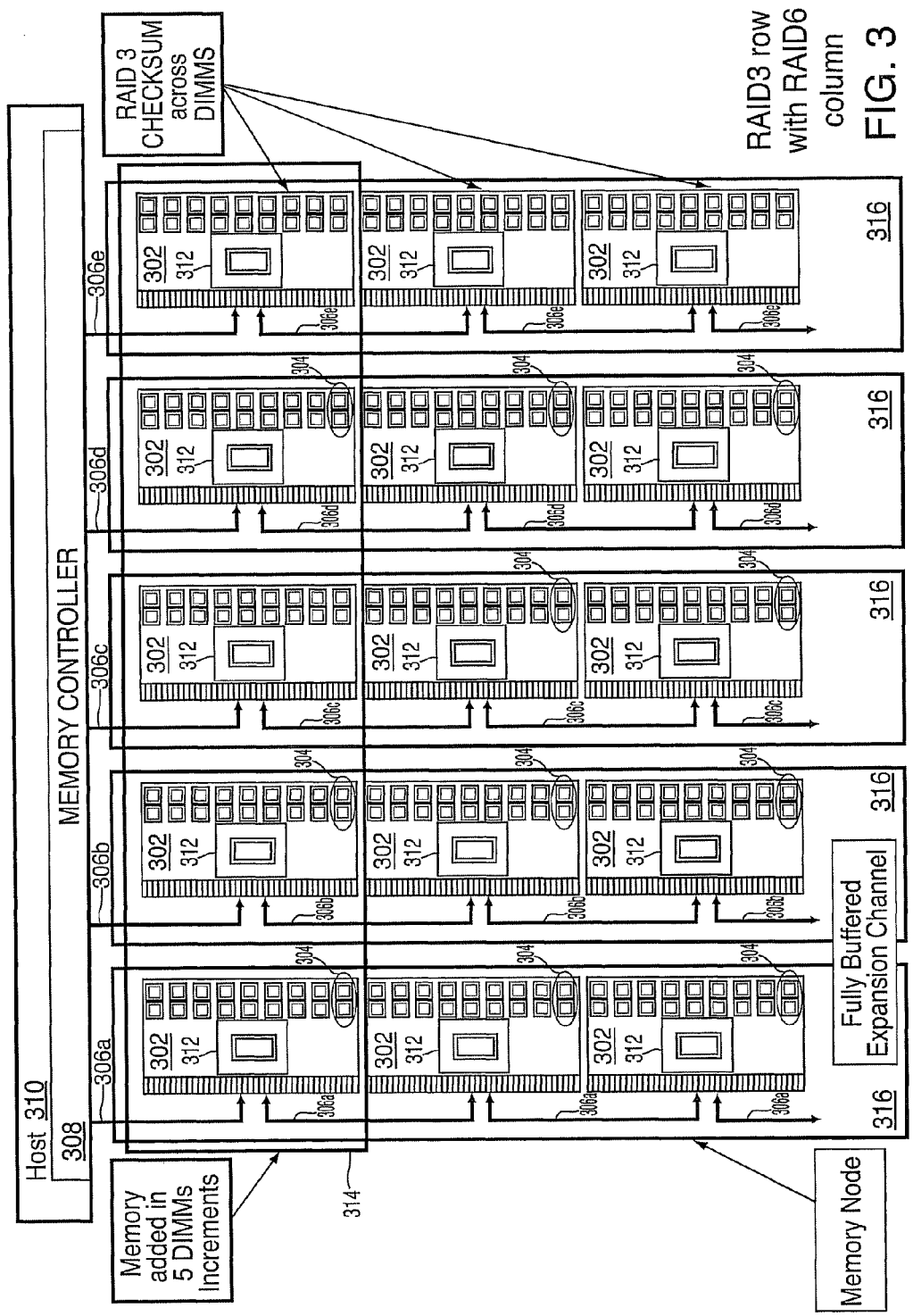
FIG. 3 is a block diagram of an exemplary computer memory system configuration utilized by an exemplary embodiment of the present invention.

FIG. 3 illustrates how a computer memory system is configured in an exemplary embodiment. Memory is added to the system in blocks 314 (groups) of 5 DIMMs 302, with 18 DRAM chips per DIMM 302. Thus, in each memory block 314 there is a total of 90 DRAM chips across the 5 DIMMs 302. 64 of the DRAM chips contain customer-usable data and 26 of the DRAM chips are used to hold checksums (the DRAM chips labeled 304 and all of the DRAM chips in the block 314 located on the DIMM 302 that is connected to memory channel 306e). Each memory block access provides 360 bytes of data (assuming DRAMs are 4 bytes), of which 256 bytes are usable customer data and 104 bytes are for checksums. This results in a reliability and serviceability (RAS) overhead of 28.9%. Clearly, this invention is not limited to this specific memory configuration and it is applicable to many other memory configurations using different DRAM chips and DIMM structures.

The exemplary embodiment depicted in FIG. 3 includes five memory nodes 316 each including three memory modules (DIMMs 302) cascade interconnected to a memory channel 306. In this exemplary embodiment, 5 memory channels 306a-e are connected to a memory controller 308 located in a host system 310. Each of the DIMMs 302 includes a hub device 312 for communicating with the memory devices (e.g., DRAM chips) and the memory channels 306.

In this exemplary embodiment, the ECCs are generated on blocks of 64 data bytes to provide chopped burst mode support and low latency access by the use of a critical word first policy (i.e., the memory system is designed to retrieve words in the order of importance). In the DDR3 devices, "burst chopped mode" support enables DRAM accesses in bursts of 4 instead of the normal bursts of 8 specified for DDR3. The ECCs used in the invention can also be applied to blocks of 128 bytes and still support chopped burst mode. The codes can be applied to blocks of 64, 128 or 256 bytes. However, if the codes are applied to the full 256 bytes retrieved or stored in a single memory access, chopped burst mode cannot be supported because all 256 bytes of data are needed to generate or regenerate the checksums for comparison to the stored checksums to detect errors.

FIG. 3 is a high level view of one embodiment of the RAM system structure according to an embodiment of the present invention. Each memory node 316 is comprised of 3 DIMMs 312. The number of DIMMs 312 per memory node 316 can be expanded to include more than 3 DIMMs 312 through such means as the expansion (e.g. cascade-interconnect) bus available on many hub-based modules. This memory node structure depicted in FIG. 3 allows any memory node 316 to be powered down and allows for DIMM replacement without impact to system memory operation. The memory system will continue to operate unimpaired with any single memory node 316 powered down.

In FIG. 3, the DRAM chips labeled 304 and all of the DRAM chips in the memory node 316 connected to memory channel 306e hold special ECCs that make concurrent DIMM repair possible. The rest of the DRAMs on the DIMMs 302 hold useable customer data.

DIMMs 302 are added to the system in blocks of 5 DIMM increments. The top row of 5 DIMMs in FIG. 3 represents the first DIMM block 314 of the system. It also represents the minimum memory configuration. The next 5 DIMM blocks would be the row directly beneath it.

The 5th DIMM in each column (e.g. the DIMMs in the far right of each row connected to memory channel 306e), in the right-most node have DRAM chips that contain a RAID-3 check sum calculated across the DIMMs in the other memory nodes 316. The DRAMs connected to memory channel 306e contain no (or very minimal) customer useable data. RAID-5 is often used for HDDs because unlike RAID-3 the checksums are distributed across all of the HDDs to avoid bottlenecks. No such bottleneck exists in this embodiment since all the DRAM chips in a memory block are accessed simultaneously. As such, distributing the checksum is unnecessary. In this embodiment, the data elements have a symbol length of one byte because 64 byte data blocks are being operating on in a single access. Other embodiments use RAID-4 instead of RAID-3, including data elements with longer symbol sizes. Throughout the remainder of the description herein, the term RAID-3 will be used with the understanding that RAID-4 could also be used in some manifestations. The important point is that distributed parity, like what is used in RAID-5 to improve performance for HDD configurations is not needed here. The RAID-3 checksums are calculated using the corresponding data elements from each corresponding DRAM chip in the other memory nodes 316 which correspond to the columns of DIMMs 302 in FIG. 3. By using RAID-3 across each DIMM full DIMM failures can be corrected when the specific DIMM 302 with the error is pinpointed though an independent means.

Exemplary embodiments utilize 2 independent ECCs, one applied horizontally and one applied vertically that provide effective error detection and error isolation properties. It is far more difficult to detect and pinpoint DRAM chip errors, especially more subtle errors such as single bit flips (single cell errors), than it is to detect and isolate HDD errors where RAID-3 and RAID-6 codes are used extensively to correct errors. HDDs often utilize imbedded codes on devices associated with each data element or groups of data elements to detect and pinpoint more subtle errors. These codes include simple parity along with CRCs and LRCs that provide better error detection and isolation. The effectiveness of RAID-3 and RAID-6 at correcting errors doubles when the error can be pinpointed through an independent means. The interface from a disk adapter to a HDD is normally a command/response type interface that allows for much better detection for completely failed HDDs than what is normally provided by the interface to each DRAM chip.

The HDD interface is such that a disk adapter immediately recognizes if a specific HDD is not responding. If a DRAM chip fails there may be no indication of the failure other that the data retrieved is not what was stored, which must be detected by some independent means. HDD storage is cheap and dense so the overhead associated with the addition of checking is not nearly as prohibitively expensive as RAM. Adding imbedded checkers to RAM to improve error detection capabilities can significantly impact memory density, power consumption, performance, overall memory size and thus cost for a computer system. It is critically important that the RAM ECC codes be as efficient as possible.

To overcome these limitations, exemplary embodiments described herein utilize a RAID-3 code applied horizontally, a RAID-6 code applied vertically, and 2-dimensional triangulation to effectively isolate errors. Once the error is isolated, both the RAID-3 row code and the RAID-6 column codes can be used to correct the errors. As was already described, the RAID-3 code is applied across DIMMs. The RAID-6 code, an [18,16] R-S code in an exemplary embodiment, is applied to each DIMM independently. The DRAM chips labeled 304 in FIG. 3 hold the [18,16] R-S checksums for the DIMMs 302 on which they reside. These [18,16] R-S checksums are computed using the corresponding data elements of the other 16 DRAM chips on each DIMM 302.

The combination of these independent ECCs applied horizontally and vertically to each data element, RAID-3 applied to DRAM chip data elements in rows across the DIMMs, and RAID-6 applied to DRAM chip data elements in columns to each DIMM, substantially enhances fault isolation and error correction capabilities without substantial overhead. This new ECC has an overhead of 28.9% or 17.8% more than many current ECCs used on high-end systems today. An exemplary current ECC code for high-end system memory is a [35, 32] R-S code that provides single chip error correction, and double chip error detection.

Exemplary embodiments described herein provide 100% detection and correction with high probability of up to a full DIMM failure (18 DRAM chips) as described herein below. For a greater than 2 DRAM chip error on a single DIMM there is a small chance that the RAID-6 column equations will erroneously produce what appears to be a valid solution. In this case, RAID-6 column applied will not necessarily detect the errors. However as long as the errors are contained to a single DIMM the RAID-5 checks will detect the errors 100% of the time. Once the failing DIMM has been identified, exemplary embodiments of the present invention will correct up to a full DIMM failure 100% of the time.

As described herein below, exemplary embodiments also provide for 100% detection and correction with high probability of up to a full chip failure coincident with a full DIMM failure (19 DRAM chips). The capability of recovery from secondary errors is important because although unlikely, because simultaneous failure events are rare, there a chance of encountering a secondary error on another DIMM coincident with up to a full DIMM failure before or during the concurrent DIMM repair can be executed or completed. This is especially true with single cell secondary failures. As before, once the failing DIMM has been identified, exemplary embodiments of the present invention will correct up to a full DIMM failure coincident with a chip (also referred to herein as a memory device) error 100% of the time.

Following are exemplary error scenarios to demonstrate how exemplary embodiments of the present function, highlighting the enhanced recovery effectiveness as well as any limitations.

FIG. 4 shows a logical view of the memory system configuration just described in reference to FIG. 3. As used in the following description: Dxy=data element; Pxy=RAID-3 row checksums; Pxy'=regenerated checksums; Qxy=RAID-6 column checksums; Qxy'=regenerated checksums; Q0x=one RAID-6 column checksum (this will be RAID-5 column check sum of RAID-6, e.g. Q01=D01+D11+D21+ . . . +DF1, where "+" is an XOR); Q1y=the other RAID-6 column checksums (e.g., Q11=D01+D11*x+D21*x ^2+ . . . + DF1*x^15; exy, zxy and wxy=errors (random variables added to the correct data to produce errors); and Rxy=row RAID-3 checksums of the Qxy checksums.

Referencing FIG. 4, the right most logical representation depicts a full operational computer memory configuration. Each column represents a single DIMM composed of 18 DRAM chips. The data elements on each DRAM chip are designated as Dxy. The RAID-3 checksum elements 402 (Pxy and Rxy), are generated row by row on each DRAM data element across the DIMMs. For RAID-3, the checksums are the XOR of the data elements in each row: Px0=Dx0+Dx1+ Dx2+Dx3. For example, when x=2, P20=D20+D21+D22+ D23.

The RAID-6 checksum elements 404 generated down columns applied to each data element in the associated column are designated as Qxy.

FIG. 4 illustrates how a single DRAM chip error is detected and corrected. The logical representation on the left shows a fully functional memory with no errors. The illustration on the right side of FIG. 4 shows that an error has occurred in the DRAM chip labeled D42. This error can be a single bit error, a multi-bit error or any other error combination up to a complete failure of the DRAM chip. An exemplary embodiment of the present invention provides 100% detection and correction for single DRAM chip errors.

The specific DRAM chip with the error is isolated with a technique referred to herein as two-dimensional triangulation, where the RAID-3 row checksums and RAID-6 column checksums are used in conjunction to pinpoint the location of the error. During a memory read operation, RAID-3 checksums Pxy' and RAID-6 checksums Qxy' are regenerated from the data read from memory. The regenerated checksums Pxy', Qxy', and Rxy' are compared to the stored checksums Pxy, Qxy, and Rxy. If they are all equal: Pxy'=Pxy, Qxy'=Qxy, and Rxy'=Rxy, then it can be assumed that there are no data errors. The data retrieved from memory is verified to be correct. If only a single regenerated checksum Qxy' does not match the stored checksum, then this indicates that the DRAM chip that holds the checksum has an error. Since the customer data is still valid in this case, no data correction is required.

As illustrated in FIG. 4, the re-generated RAID-3 checksum, Pxy', associated with that row does not match the stored checksum which is an indication there is an error in that row. In this example, P40 does match P40' so there is known to be an error associated with the row containing D40, D41, D42, D43, and P40. It may be that the data elements D40, D41, D42, D43 or the row RAID-3 checksum P40 is associated with the error. There could even be multiple errors. Comparing the regenerated row RAID-3 checksum P40' to the stored checksum P40 will only isolate the row. The RAID-6 column checksums are utilized for further isolation. If all the regenerated RAID-6 column checksums, Qxy', match the stored checksums, Qxy, then the RAID-3 checksum DRAM chip Pxy has the error. In this example, the regenerated RAID-6 checksums, Q02' and Q12', do not match the stored checksums, Q02 and Q12. Now using two-dimensional triangulation, the error is pinpointed to D42. This is the DRAM chip with the error.

Once the error has been isolated, error correction is accomplished simply by the XOR of the other row data elements with the RAID-3 stored RAID-3 checksum: D42=D40+D41+ D43+P04 or the XOR of column data elements with the stored RAID-6 checksum: D42=D02+D12+D22+D32+D52+ . . . + DB2+DC2+DD2+DE2+DF2+Q02. The other RAID-6, [18, 16] R-S equation can also be used to correct for the error.

For this to be a single DRAM chip error, all 3 regenerated checksums, the RAID-3 checksum and the two RAID-6 checksums, must not match the stored checksums and all the other regenerated RAID-3 and RAID-6 checksums must match their stored checksums. In this example, P40' does not match P40 and there is a corresponding mismatch with the regenerated and stored RAID-6 checksum Q02' with Q02 and Q12' with Q12 so it is known that there is a DRAM chip error associated with D42. Similarly, if only one of the regenerated RAID-6 checksums Q0y' or Q1y' does not match one of the corresponding stored RAID-3 checksums Q0y or Q1y, it is known that it is the source of the error. For there to be a single data element error, Dxy, the regenerated and stored checksums Q0y' and Q0y together with Q1y' and Q1y must show a mismatch as well as Pxy' and Pxy.

Examples of more complicated error scenarios follow in order to explore the full capabilities of exemplary embodiments of the present invention.

FIG. 5 illustrates how the approach just described is easily extended to handle multi-DRAM chip errors on a single DIMM, and up to a full DIMM failure of all 18 DRAM chips on the DIMM. First, the single DIMM failure scenario is described. In this example, many, perhaps all, of the regenerated RAID-3 row checksum Pxy' and the stored Pxy do not match, indicating that there are multiple rows with errors. However, in this example, when the regenerated RAID6 checksum Qxy' is compared to the stored checksums Qxy it is found that only the two checksums associated with a single column do not match. Therefore, it is known that the errors are contained within a single DIMM. In this example, the regenerated checksum Q02' and Q12' do not match the stored checksums Q0' and Q12 so it is known that the faults are associated with the 3rd DIMM. In rare cases there is a possibility that the errors within the DIMM are such that the associated RAID-6 checksums are equal to zero, in which case this method for decoding only gives error detection, not error correction.

As long as there is only a single column with errors, the entire DIMMs worth of data can be reproduced, the erasure corrected using column RAID-3 as follows: Dx2=Dx0+Dx1+ Dx3+Px0 where x=0, 1, 2, . . . , F. This is a very important capability. Full DIMM failure recovery is necessary to allow for concurrent DIMM repair. When the DIMM is hot plugged it will look like a full DIMM failure. Adding a presence detect line for each DIMM can help guarantee isolation when a DIMM is removed from the system.

Figure 6:
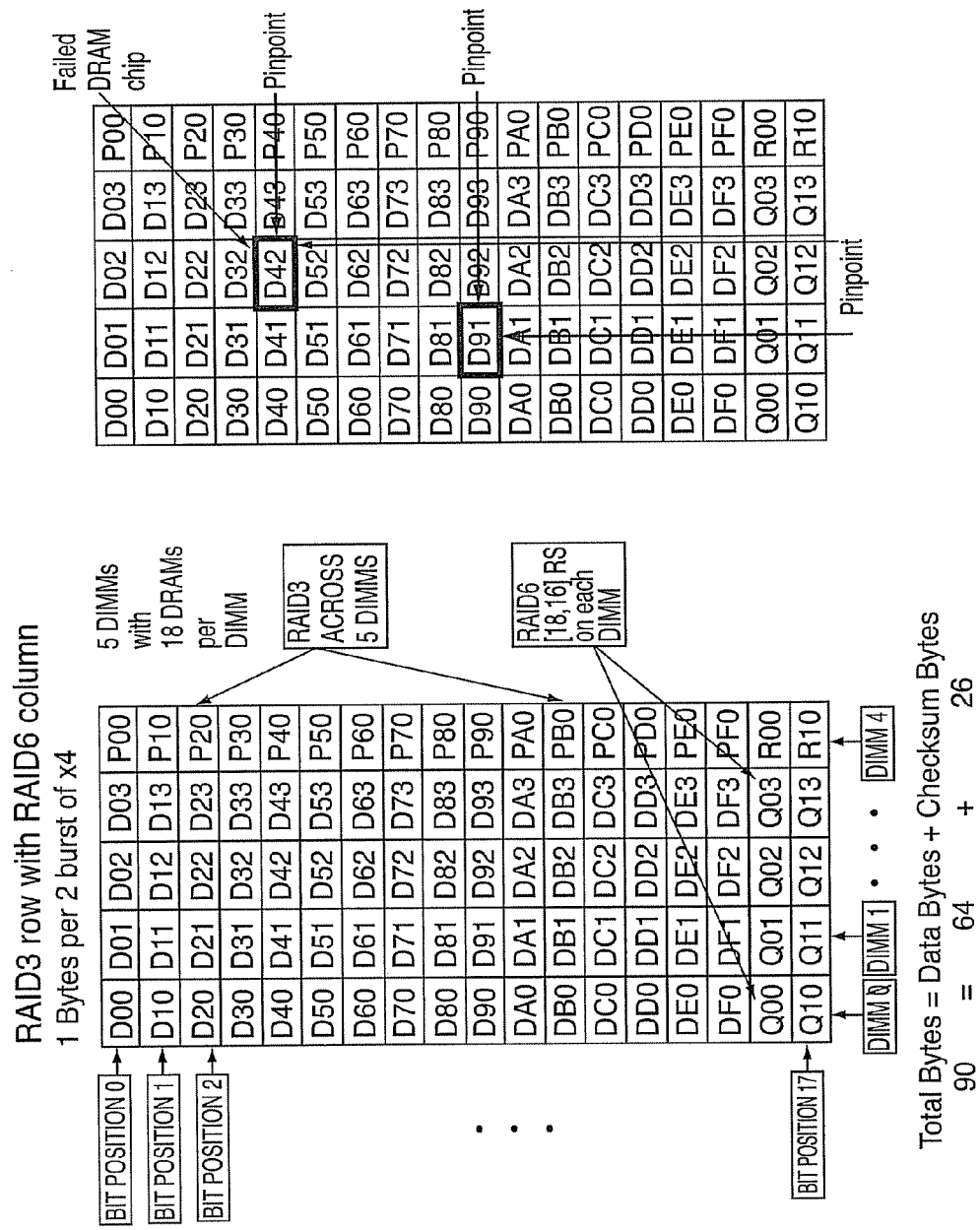
FIG. 6 is a block diagram of a logical view of correcting two DRAM chip errors.

FIG. 6 illustrates how 2 DRAM chip errors are handled when they occur on 2 different DIMMs. The probability of having 2 random errors occur simultaneously is virtually zero, however there is some probability of a second failure being encountered before the first failure is eliminated by a concurrent repair or a DRAM sparing action.

In FIG. 6 there are real DRAM chip errors associated with D42 and D91. The errors are detected through the same checksum regeneration procedure previously described. In doing that, the regenerated RAID-3 checksums P40' and P90' will not match stored checksum P40 and P90 so it is known that the errors are associated with these 2 rows. In addition, the regenerated RAID-6 checksums Q01' and Q11' associated with the 2nd column will not match the stored checksums Q01 and Q11, so it is known that there is an error associated with the 2nd column. Furthermore, the regenerated RAID-6 checksums Q02' and Q12' associated with the 3rd column will not match the stored checksums Q02 and Q12 so it is known that there is an error associated with the 3rd column. Two-dimensional triangulation with the independent checksums is used to pinpoint the DRAMs with errors. The intersection of P40 and Q02 or Q12 clearly correctly pinpoints D42 as a DRAM chip with an error. The intersection of P90 and Q01 or Q11 also clearly and correctly pinpoints D91 as a DRAM chip with an error.

There is also an intersection of P40 with Q01 or Q11 pinpointing D41 and an intersection of P90 with Q02 or Q12 pinpointing D92. However, these DRAM chips do not have errors. It is not possible to determine from this alone which of the 4 DRAM chips have errors. Nevertheless, this is not an issue. The RAID-6, the [18, 16] R-S codes have a minimum distance of 3 which allows isolation and correction of a single error or correction of 2 erasures when the locations are pinpointed thorough another independent means. In this case, the RAID-3 row checksum allows pinpointing of the row and the RAID-6 column checksums allow us pinpointing of the column. There are now 4 equations and 4 unknowns D41, D42, D91, D92 for correcting the erasure of all 4 DRAM chips in question:

$$Q01=D01+D11+D21+D31+D41+D51+D61+D71+D81+D91+\ldots+DF1;$$

$$Q11=D01+D11*x+D21*x^2+\ldots+DF1*X^{15};$$

$$Q03=D02+D12+D22+D32+D42+D52+D62+D72+D82+D92+\ldots+DF2;\text{ and}$$

$$Q12=D02+D12*x+D22*x^2+\ldots+DF2*X^{15}.$$

FIG. 6 illustrates how up to any 2 simultaneous DRAM chip errors can be isolated and corrected 100% of the time.

FIG. 7 illustrates the difficulty encountered when there is up to a full DIMM failure coincident with a secondary DRAM chip failure. If the first failure is not isolated and pinpointed, then it is not possible to determine which DRAM chips on the 2 DIMMs have errors from simply comparing the regenerated and stored checksums. This is due to the fact that most if not all of the RAID-3 row checkers, Pxy and Rxy, indicate that there are errors associated with the rows. However, the intersection of the Pxy row checkers with the Qxy column checkers indicates there could be potential errors on all the DRAM chips on both DIMMs. Nevertheless there is a way around this dilemma.

FIG. 8 has a bit more detail illustrating how errors propagate during correction when there is a full DIMM error coincident with another single DRAM chip error on another DIMM. In this case, it is not required to know which error occurred first for the algorithm to work properly for providing for 100% detection and correction with high probability of these types of errors. As was already indicated, when a full DIMM error occurs coincident with another single DRAM chip error most, perhaps all, of the regenerated RAID-3 row checksums, Pxy', compare with the stored checksum, Pxy, do not match, indicating errors in the rows. However, in this case the regenerated RAID-6 column checksums for the first DIMM, Q00' and Q10', do not match the stored checksums, Q00 and Q10, indicating an error associated with the first DIMM. In addition, the regenerated RAID-6 column checksum for the first DIMM, Q02' and Q12', do not match the stored checksums, Q02 and Q12, indicating an error associated with the 3rd DIMM (this with high probability). In this example, the failed DIMM is not pinpointed so recovery from the errors needs to occur without that information. Data can only be corrected if there is up to a single DRAM chip error on one DIMM coincident with a full DIMM failure on another DIMM (19 DRAM chips errors max). To accomplish this, it must be assumed that each DIMM in question has the full DIMM error and the other has the single DRAM chip error looking for a single valid solution in both cases.

Referring back to FIG. 8, where it is assumed correctly that the 3rd DIMM has the full DIMM failure and the first DIMM has the single DRAM chip error. The RAID-3 column equations may be used to correct the data on the 3rd DIMM as follows: Dx2=Dx0+Dx1+Dx3+Px0 where x=0, 1, 2, . . . , F.

In attempting to use RAID-3 to correct for the erasure on the 3rd DIMM, the error pattern ends up on the right afterwards. D40 and D42 still contain error e40. To make matters worse, the error is undetected by row RAID-3, since it is the same error it is canceled out during the XOR operation. The stored P40 compared to the regenerated P40' indicates there is no error. Nevertheless, it is known that there still has to be at least one error, so the system goes ahead and uses the column RAID-6 equations to pinpoint and correct it. This will eliminate the e40 error associated with both D40 and D42 and all the RAID-3 and RAID-6 regenerated and stored checksums match. Now it is assumed that the other DIMM has the full DIMM failure to ensure that this is not a valid solution.

Figure 9A:
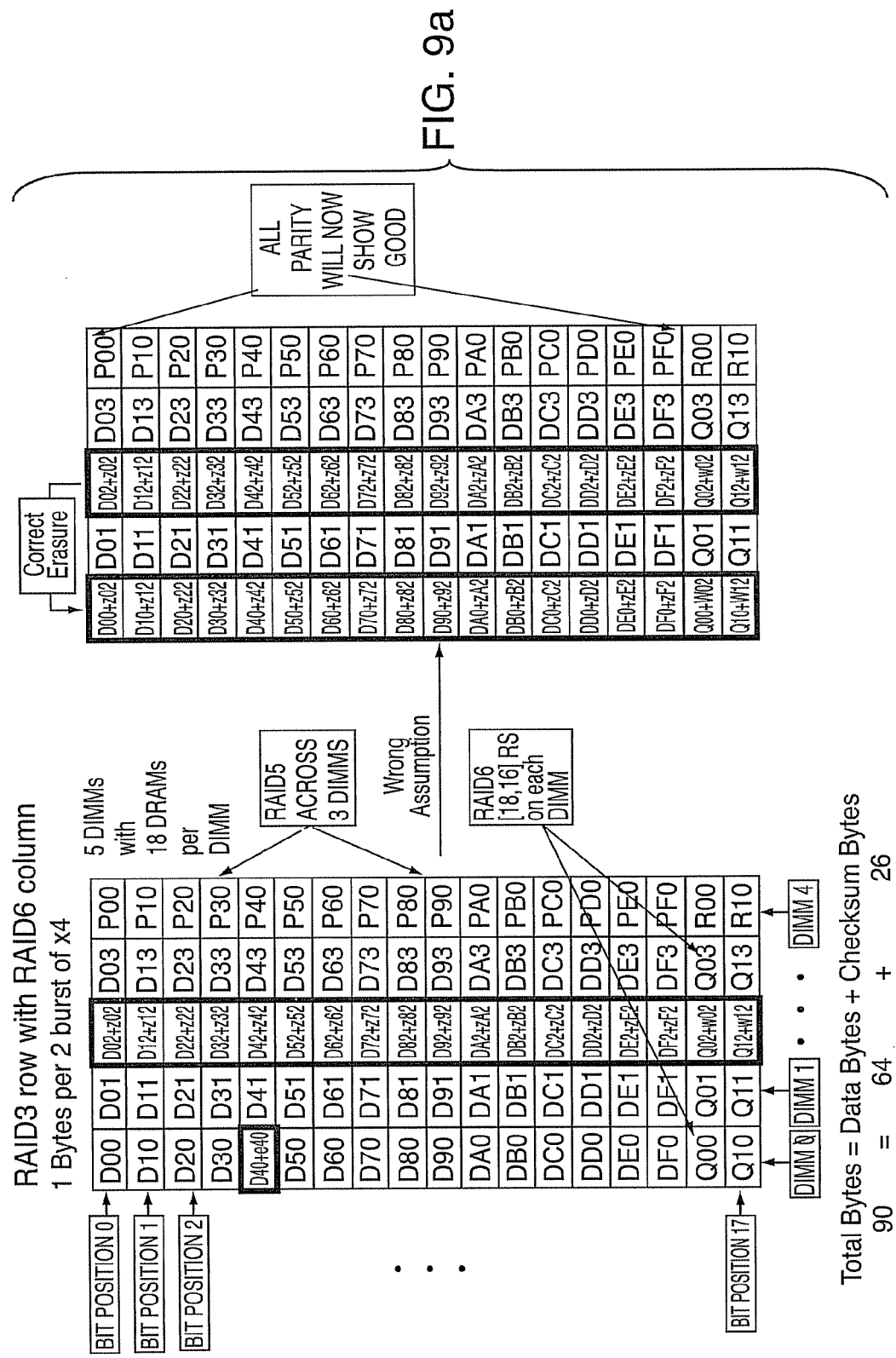
FIGS. 9a-9c depict various scenarios for correcting a full DIMM failure coincident with a secondary DRAM chip failure.

FIG. 9a shows what happens when it is erroneously assumed that the first DIMM has the complete DIMM failure and that the third DIMM has the single DRAM chip error. As before, the RAID3 column equation is utilized to correct the data on the 3rd DIMM as follows: Dx0=Dx1+Dx2+Dx3+Px0 where x=0, 1, 2, . . . , F. The result is the error pattern depicted in the block on the right in FIG. 9a. All the errors associated with DRAM chips on the 3rd DIMM are propagated to the corresponding DRAM chips on the first DIMMs. Since they are the same errors, comparing all the regenerated RAID-3 row checksums Pxy' to the stored checksums indicates that they are the same. The RAID-3 row checksum will not detect any errors so there will be no indication there are row errors. Nevertheless, the first and third RAID-6 column checksums will indicate that errors exist in those columns. Thus, so far, from interrogation of the regenerated and stored checksums this looks just like what happened when it was assumed correctly that the other DIMM had the full DIM failure except that now errors have been propagated into every DRAM on the first and 3rd DIMMs.

Figure 9B:
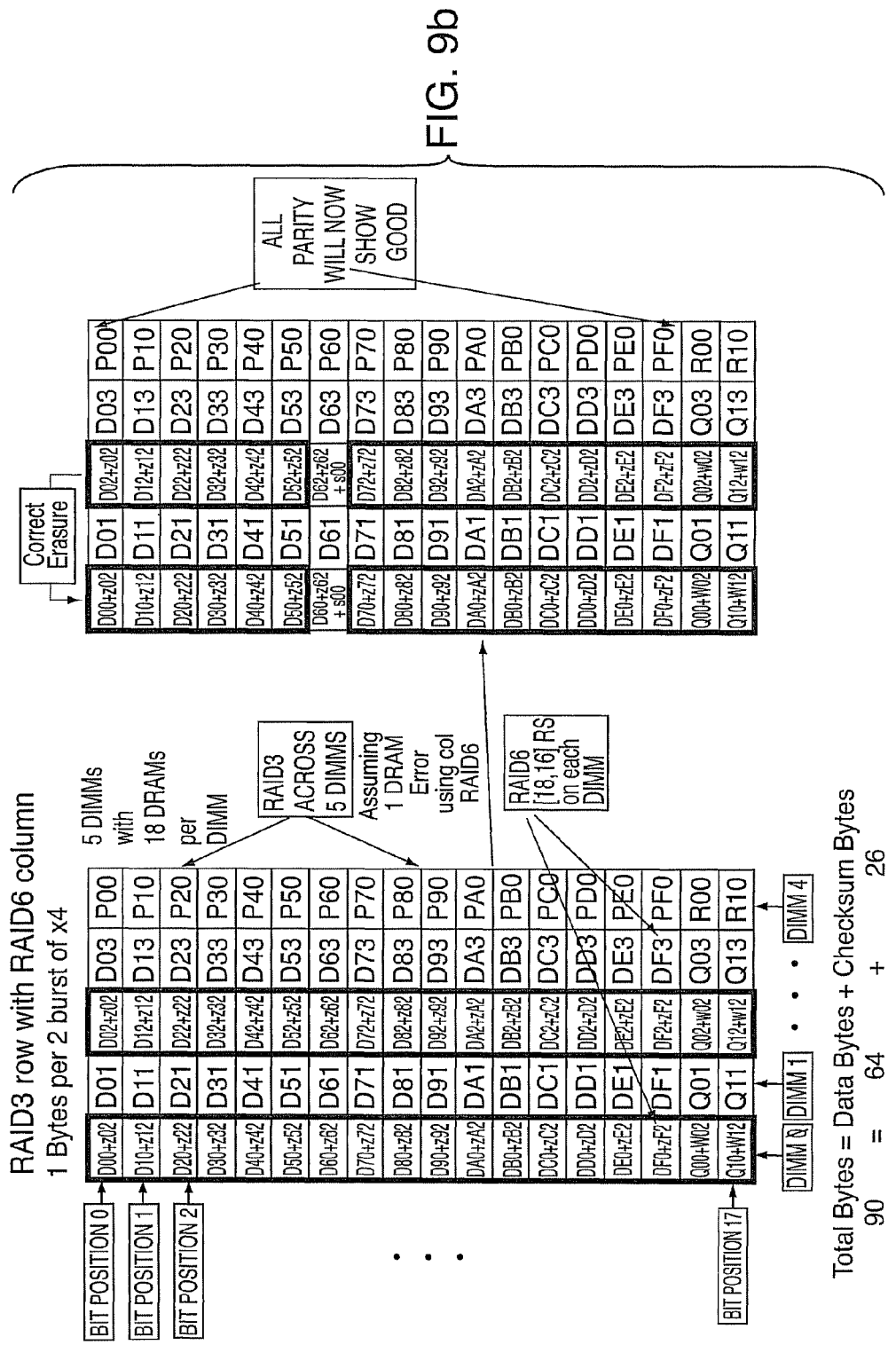

FIG. 9b depicts what happens when an attempt is made to use RAID-6 columns to pinpoint and correct for what would be two single chip errors as was done before when the correct assumption had been made. Most often an invalid solution will result when trying to solve the RAID-6 equations. When this happens, it is detected that the answer is wrong and known that other answers are correct. However there are 18 valid locations out of 255 possibilities so there is a relatively high probability: (18/255)=0.0706, of not detecting the error. There is a 7% (7 in 100) chance of generating an invalid solution that appears valid and goes undetected. In this case, the RAID-6 correction will be executed, and once complete, it will be found that the regenerated checksums equal the stored checksums. It will be found that all the checksums match both the RAID-3 and RAID-6 checksums. Using the RAID-6 equations can produce an erroneous result when there is more than one error in the column (here RAID6 is being used as a single error correct code, not a two erased symbol error correct code). In this example, in FIG. 9$b$, the calculations result in the error pattern on the right where the errors associated with the each corresponding DRAM chip in each row are identical: s00=Q00+Q00'=z02+z12+z22+ . . . ZF2+W02 and s02=Q02+Q02'=Z02+Z12+Z22+ . . . +ZF2+W02, so that: s00=s02.

This indicates that the solutions to the RAID-6 equations are independent of the stored data and only dependent on the errors which are the same for both columns. Since the errors are the same, this guarantees that invalid solutions that go undetected will row align, making it impossible for the RAID-3 or RAID-6 checksums to detect the errors. As long as the erroneous undetected solutions are row aligned, the errors will not be detected by RAID-3 row checksums after the RAID6 column correction is performed (assuming this RAID-6 correction does not result in an uncorrectable error or "UE"). In this example the stored P60 and regenerated P60' checksums match because the error: S00+z62 in both D60 and D62 cancel out during the XOR operation.

Figure 9C:
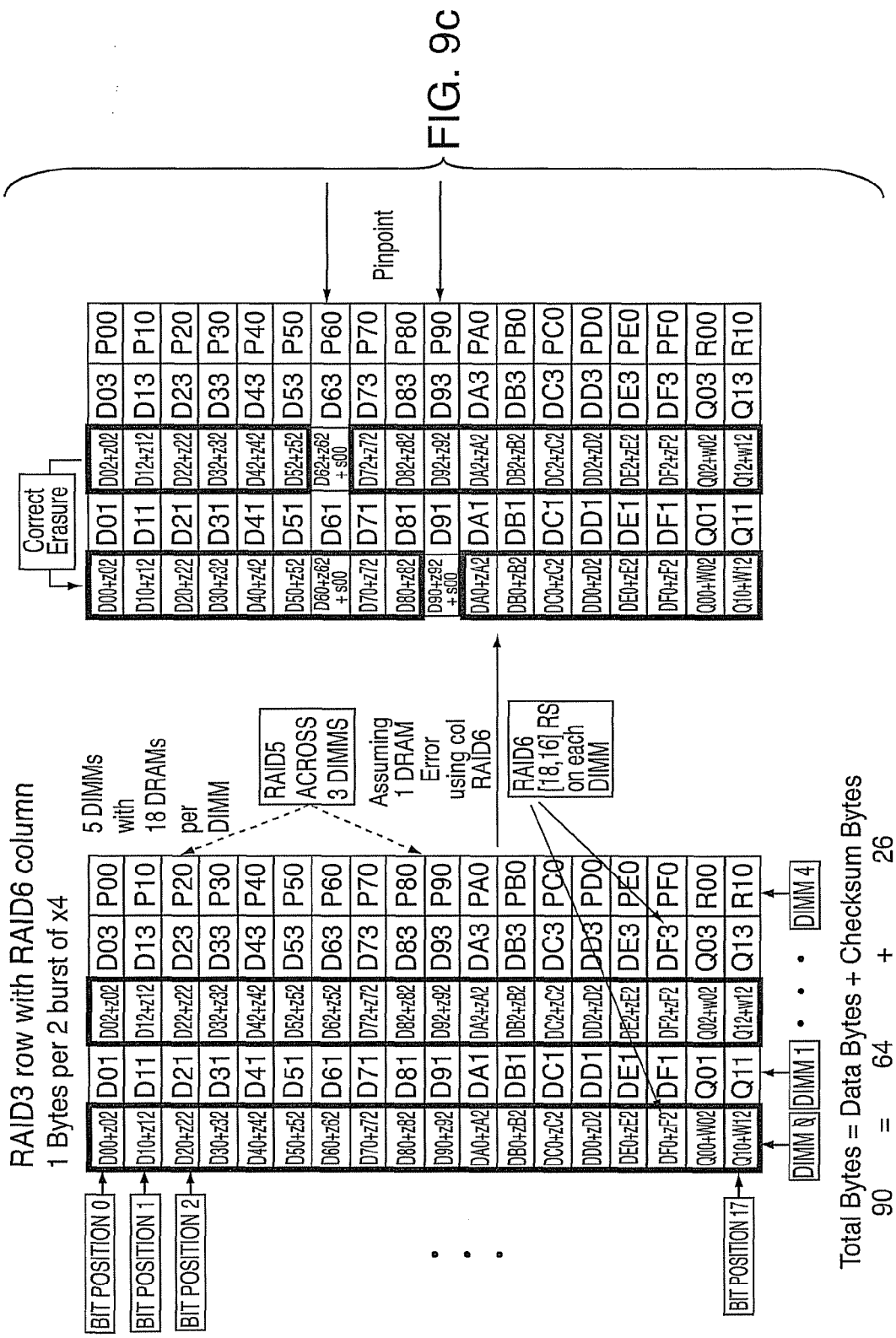

However, there is a relatively simple solution to this problem as illustrated in FIG. 9$c$. The solution of the RAID-6 equations is a function of only the error information. The following illustrates how the row and error magnitude alignment issue of undetected errors after the RAID-6 attempted correction can be solved.

Looking at the Q00 checksum for the first column in FIG. 9$a$, Q00 the stored check sum is initially: Q00=D00+D11+D20+ . . . +DF0. After RAID-3 row is used to attempt to correct the error the stored check becomes: Qmod00=D00+D11+D20+ . . . +DF0+w02=Q00+w02. The regenerated checksum will be: Q00'=D00+D10+D20+ . . . +DF0+z02+z12+z22+ . . . +zF2. When the regenerated is compared to the stored checksum, the result is: S00=Qmod00+Q00'=Q00+w02+Q00'=z02+z12+z22+ . . . +zF2+w02.

Performing the same operation on the 3rd column results in: Q02, the stored check sum, initially being equal to: D02+D12+D22+ . . . +DF2. After RAID-3 row is used to attempt to correct the error the stored check becomes: Qmod02=D02+D12+D22+ . . . +DF2+w02=Q02+w02. The regenerated checksum will be: Q02'=D02+D12+D22+ . . . +DF2+z02+z12+z22+ . . . +zF2. When the regenerated checksum is compared to the stored checksum, the result is: S02=Qmod02+Q02'=Q02+w02+Q02'=z02+z12+z22+ . . . +zF2+w02.

Thus, it is clear that the solution for the first RAID-6 checksum in both the first and third column will be the same and will be: S00=S02=z02+z12+z22+ . . . +zF2+w02. A similar analysis of the second checksums yields: S10=S12=z02+z12*X+z22*X^2+ . . . +zF2*X^15+w12. Therefore, if the error by chance produces what appears to be a valid solution, the errors will always row align and be undetectable by the RAID-3 row checking.

There is however a simple procedure to prevent this alignment as illustrated in FIG. 9$c$. Four constants: a, b, c, d are defined such that they are all unique numbers that do not equal each other and are non-zero. The first RAID-6 checksum is modified so that instead of being: Q00=D00+D10+D20+ . . . +DF0, Q01=D01+D11+D21+ . . . +DF1, Q02=D02+D12+D22+ . . . +DF2, and Q03=D03+D13+D23+ . . . +DF3, it is: Q00=a*(D00+D10+D20+ . . . +DF0), Q01=b*(D01+D11+D21+ . . . +DF1), Q02=c*(D02+D12+D22+ . . . +DF2), and Q03=d*(D03+D13+D23+ . . . +DF3).

Working through the example again using FIG. 9$a$ for reference, the Q00 stored checksum is now initially: Q00=a*(D00+D10+D20+ . . . +DF0). After RAID-3 row is used to attempt to correct the error the stored checksum becomes: Qmod00=a*(D00+D10+D20+ . . . +DF0)+w02=Q00+w02. The regenerated checksum is: Q00'=a*(D00+D10+D20+ . . . +DF0+z02+z12+z22+ . . . +zF2). When the regenerated is compared to the stored checksum, the result is: S00=Qmod00+Q00'=Q00+w02+Q00'=a*(z02+z12+z22+ . . . +zF2)+w02. This is divided by "a" to obtain the stored data value, resulting in: S00/a=z02+z12+z22+ . . . +zF2+w02/a.

In the third column, the first checksum retrieved is Q02=W02+c*(D02+D12+ . . . +DF2), and the regenerated checksum is Q02'=c*(D02+D12+ . . . +DF2+Z02+Z12+ . . . +ZF2). Thus S02=Q02+Q02'=W02+c*(Z02+Z12+ . . . +ZF2). It is clear that S02/c and S00/a are different if w02 is not equal to zero. This prevents the single symbol corrections done in columns 1 and 3 to be the same correction. This method can be improved by performing a similar modification to the checksums stored in the second redundant chip on every DIMM.

It can be seen that the solution for the first RAID-6 checksum in both the first and third column will not be the same since w02/a and w02/c are not equal when W02 is not zero. In this example, the attempt to correct the errors via RAID-6 produces data with errors in DRAM chips D62 and D90 that are detectable by the row RAID-3 checksums.

The following text shows that the first scenario in FIG. 8, where it was correctly assumed that the third DIMM has the full DIMM failure, still works when the offset is applied. Just as before, the RAID-3 column equations are utilized to correct the data on the third DIMM as follows: Dx2=Dx0+Dx1+Dx3+Px0, where x=0, 1, 2, . . . , F. In attempting to use RAID-3 to correct for the erasure on the third DIMM, the result is the error pattern on the right. D40 and D42 still contain error e40. Again, the errors are undetected by row RAID-3 since it is the same error, and therefore, they are canceled out during the row RAID-3 XOR operation. The stored P40 compared to the regenerated P40' indicates that there is no error. Nevertheless, it is known that there still has to be at least one error so the algorithm goes ahead and uses the column modified RAID-6 equations, those with the offset to pinpoint and correct them.

The modified RAID-6 equations with the offset are: Q00=a*(D00+D10+D20+ . . . +DF0), Q01=b*(D01+D11+D21+ . . . +DF1), Q02=c*(D02+D12+D22+ . . . +DF2), and Q03=d*(D03+D13+D23+ . . . +DF3). The Q00 the stored checksum is now initially: Q00=a*(D00+D10+D20+ . . . +DF0). After RAID-3 row is used to attempt to correct the error the stored check becomes: Qmod00=a*(D00+D10+D20+ . . . +DF0)=Q00. The regenerated checksum is: Q00'=a*(D00+D10+D20+ . . . +DF0+e40). When the regenerated checksum is compared to the stored checksum, the result is: S00=Qmod00+Q00'=a*(e40). The "a" is stripped off through division, resulting in e40, which is the same as the result obtained before the offset was applied.

Now, the same operation is performed on the third column. Q02 the stored check sum is initially: Q02=c*(D02+D12+D22+ . . . +DF2+e40). After RAID-3 row is used to attempt to correct the error the stored checksum becomes: Qmod02=c*(D02+D12+D22+ . . . +DF2)=Q02. The regenerated checksum is: Q02'=c*(D02+D12+D22+ . . . +DF2+e40). When the regenerated is compared to the stored checksum, the result is: S02=Qmod02+Q02'=c*(e40). The "c" is stripped off through division, resulting in e40, which is the same result obtained before the offset was applied. Thus, the offset works correctly in both cases.

Figure 10:
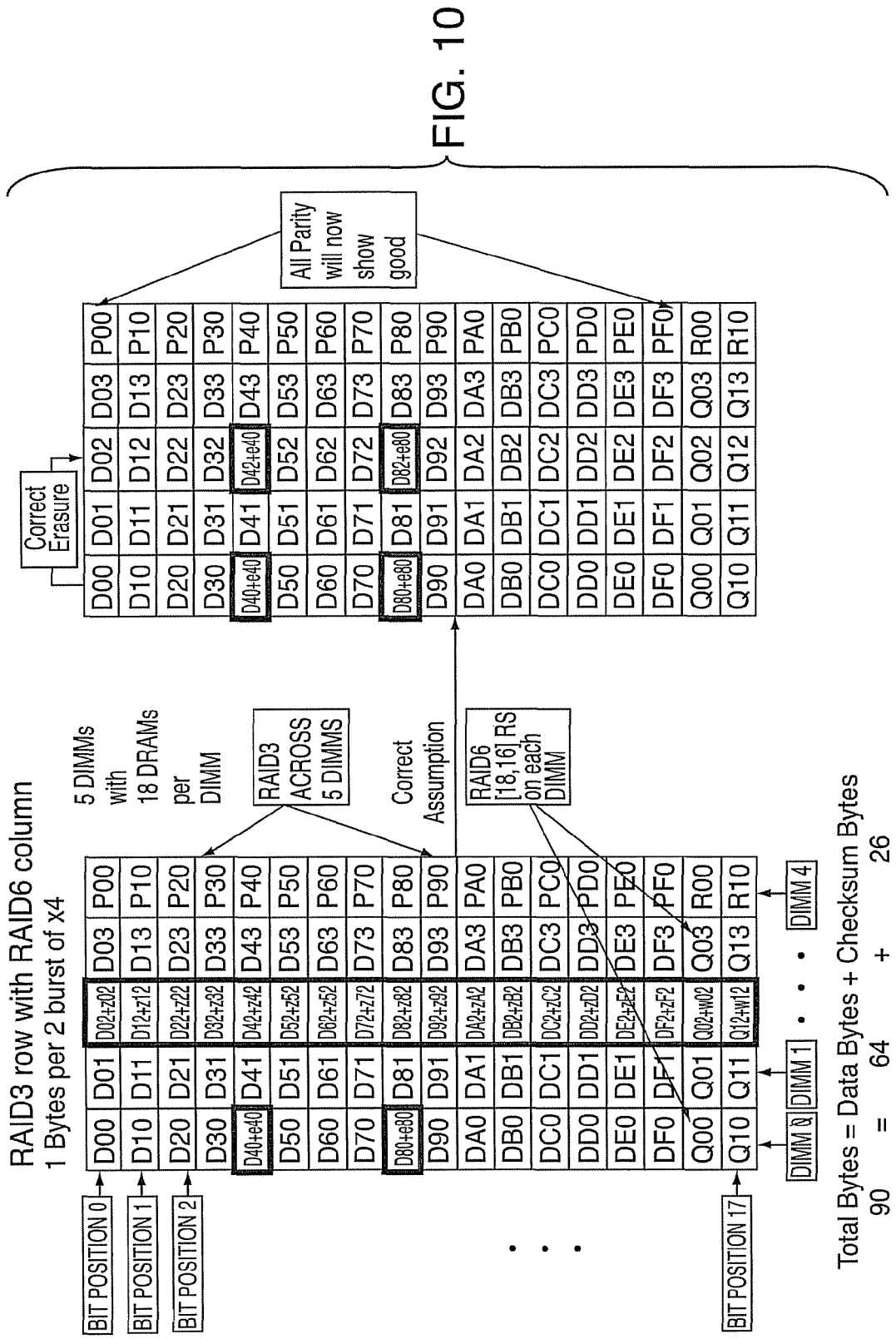
FIG. 10 is a block diagram of a logical view of correcting a full DIMM failure coincident with two additional DRAM device failures.

FIG. 10 illustrates what happens in the exceedingly unlike event of a full DIMM kill (also referred to herein as a DIMM failure) with two additional DRAM device (also referred to herein as a DRAM chips) errors occurring simultaneously (also referred to herein as coincident) on another DIMM. Here, it is first assumed correctly that the third DIMM has the fall DIMM failure. An attempt to correct the erasure is made by using the RAID-3 across rows as described earlier, ending up with the error pattern on the left. As before, neither of these errors is detectable with RAID-3 row checksums, Pxy. The errors are detectable with the RAID-6 column checksum, but since there is more than one error in each column, RAID-6 cannot pinpoint and correct the errors. If it is assumed that there is one error per row and an attempt is made to solve the RAID-6 equations as described previously, there is a 7% chance (a relatively high probability calculated as 18/255=0.0706) of not detecting the error. The offset multiplier does not help since there is no error associated with the column checksums. When the errors are not detected, the solutions will row align making it impossible to detect the problems.

Presence detect (identification that a DIMM is installed, as well as the DIMM attributes) and fault logging can be used to improve the effectiveness of exemplary embodiments of this invention.

Figure 11A:
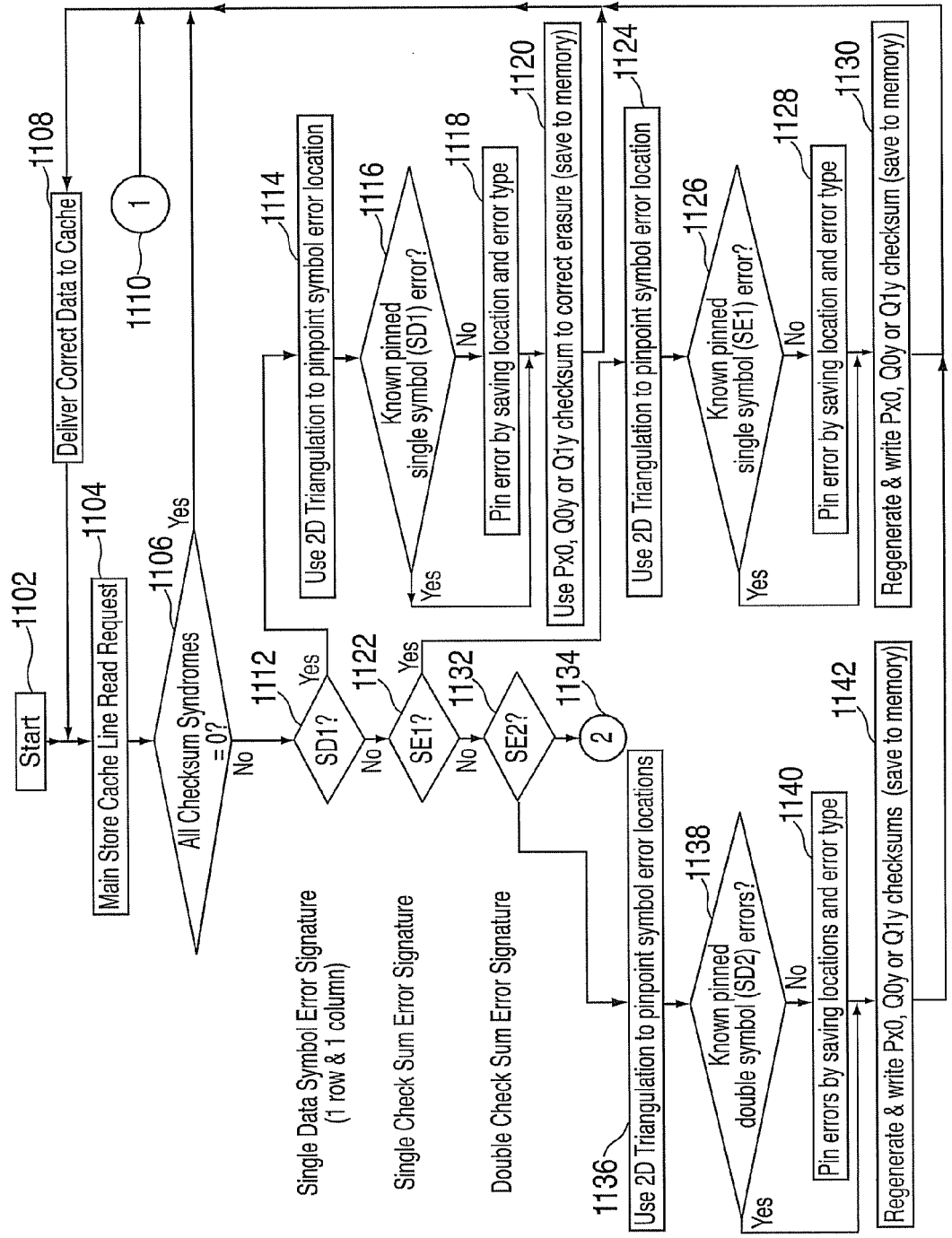
FIGS. 11a-11c is a flow diagram of a process for performing error correction and detection utilizing an exemplary embodiment of the present invention.
Figure 11B:
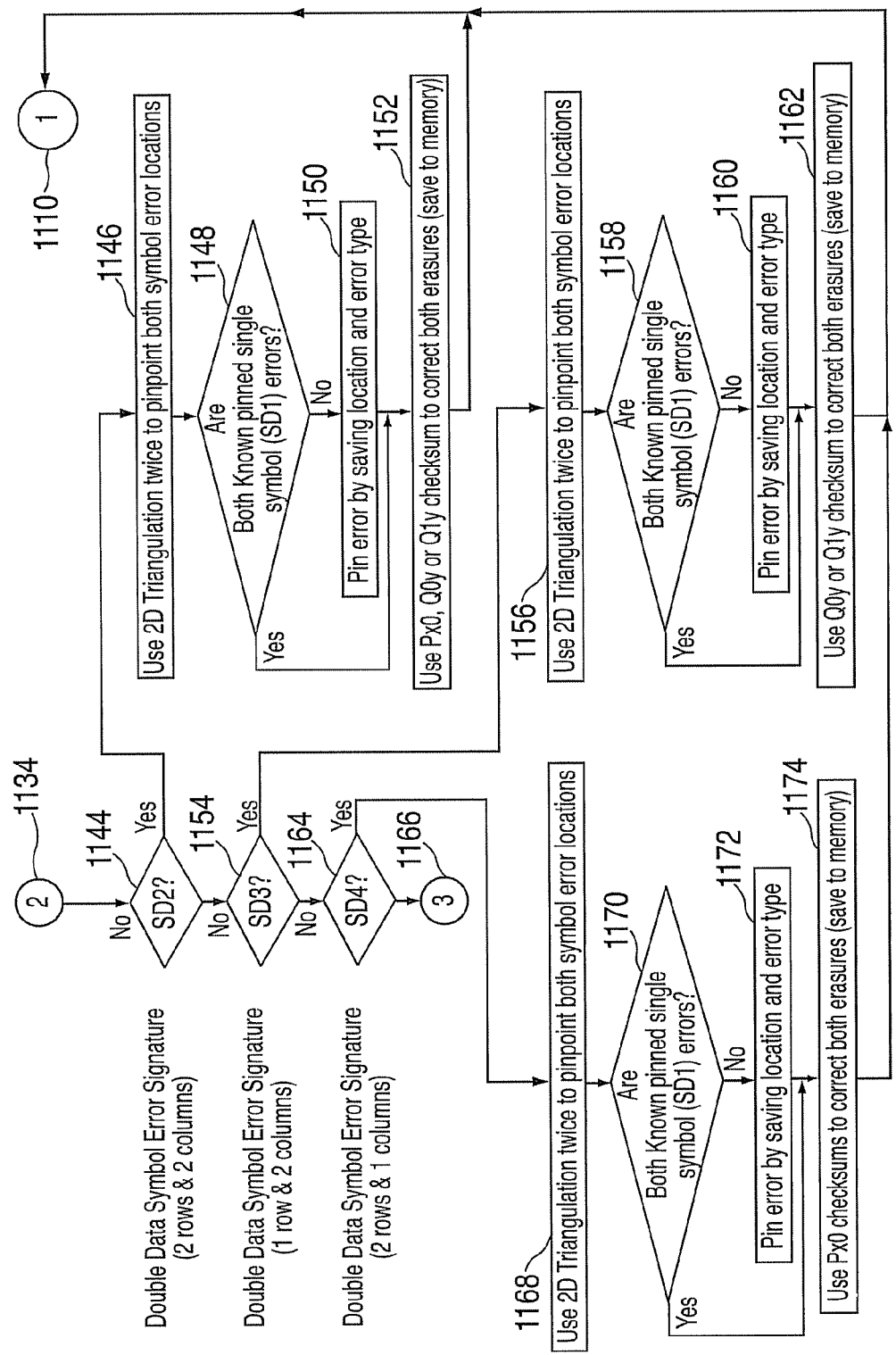
Figure 11C:
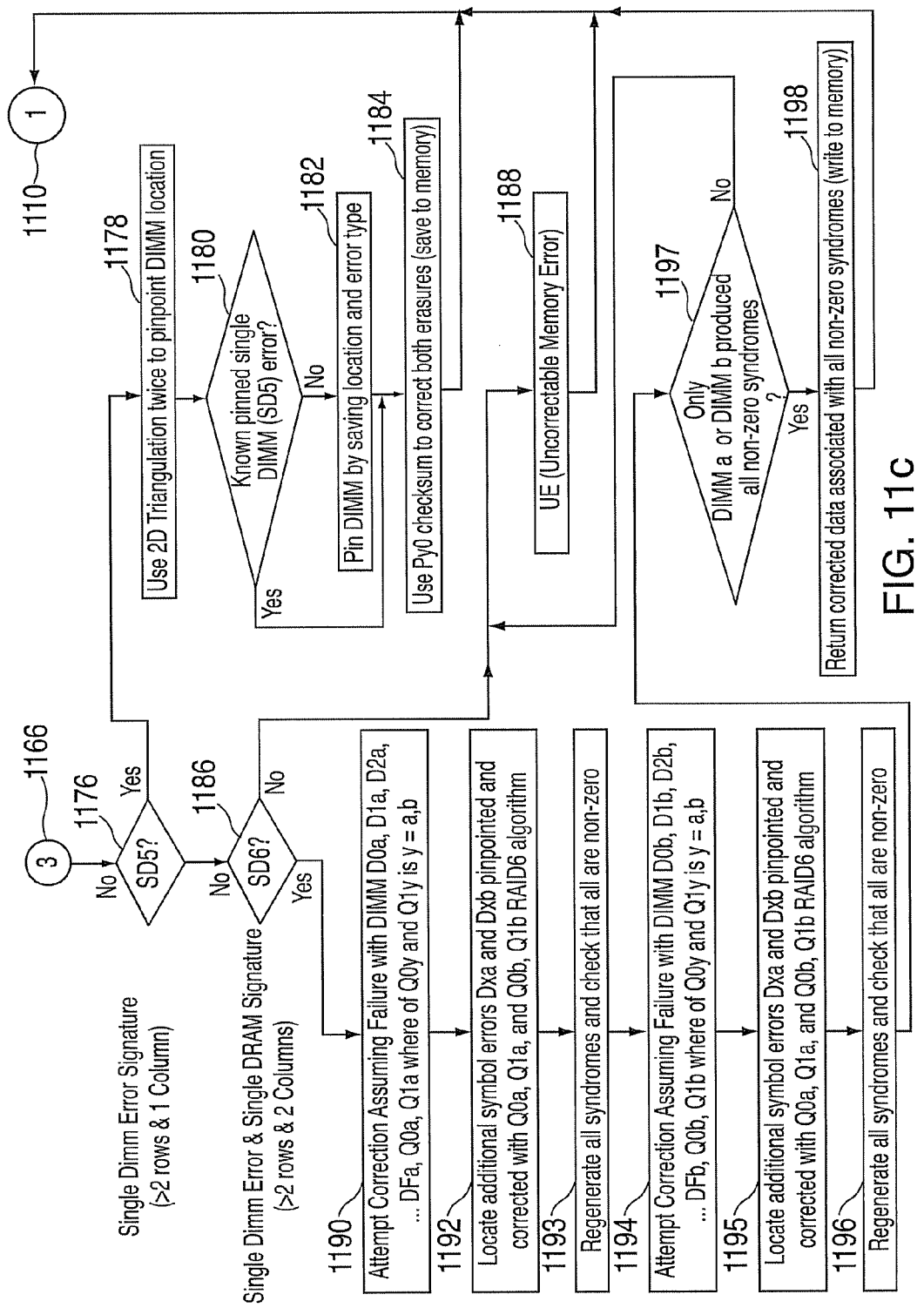

FIGS. 11a-c depict an exemplary process flow that may be implemented by exemplary embodiments to perform the processing described above. The mechanism to perform the process flow may be implemented by software and/or hardware which is located on the memory controller 308. In an alternate exemplary embodiment, portions of the mechanism are located on the memory controller 308 and portions of the mechanism are also located on one or more memory modules 302 (e.g., in the hub device 312 with processing being shared between the memory controller 308 and the memory modules 302. In another alternate exemplary embodiment, all or portions of the mechanism is located on the host processor 310.

Referring to FIG. 11a, the processing starts at block 1102. At block 1104, a read request is received (e.g., a main store cache line read request). At block 1106, it is determined if an error exists in the data returned in response to the read request. An error exists if all of the checksum syndromes are not equal to zero. If an error does not exist, then processing continues at block 1108, where the requested data is returned to the requester (e.g., deliver correct data to cache).

If it is determined at block 1106, that an error does exist, then block 1112 is performed to determine if the error signature is a single data symbol error signature (e.g., Px=1, Q0y=1 and Q1y=1). If it is, then block 1114 is performed to pinpoint the symbol error location using two-dimensional triangulation. At block 1116 it is determined if the result of the triangulation is a known pinpointed (or pinned) single symbol (SD1) error. For multiple errors, error pinning can be used to determine with greater certainty the correct error signature, thus improving the effectiveness of detection and correction for rare events when some ambiguity can be encountered. If the result of the triangulation is a known pinned single symbol (SD1) error, as determined at block 1116, then processing continues at block 1120. If it is not, then block 1118 is performed and the error is pinned by saving the location and error type. Processing then continues at block 1120 where the Px0, Q0y or Q1y checksum is used to correct the error (or erasure) by saving to memory. Processing then continues at block 1108.

If it is determined at block 1112 that the error signature is not a single data symbol error signature, then block 1122 is performed. Block 1122 is performed to determine if the error signature is a single checksum error signature affecting one row and one column (e.g., Px=1, Q0y=1 or Q1y=1). If it is, then block 1124 is performed to pinpoint the symbol error location using two-dimensional triangulation. At block 1126 it is determined if the result of the triangulation is a known pinpointed (or pinned) single symbol (SE1) error. If it is, then processing continues at block 1130. If it is not, then block 1128 is performed and the error is pinned by saving the location and error type. Processing then continues at block 1130 where the Px0, Q0y or Q1y checksum is regenerated and written to memory. Processing then continues at block 1108.

If it is determined at block 1122 that the error signature is not a single checksum error signature, then block 1132 is performed. Block 1132 is performed to determine if the error signature is a double checksum error signature (e.g., Px=1 and Q0y=1 or Px and Q1y=1). If it is, then block 1136 is performed to pinpoint the symbol error locations using two-dimensional triangulation. At block 1138 it is determined if the result of the triangulation is known pinpointed (or pinned) double symbol (SD2) errors. If it is, then processing continues at block 1142. If it is not, then block 1140 is performed and the errors are pinned by saving the location and error type. Processing then continues at block 1141 where the Px0, Q0y or Q1y checksums are regenerated and written to memory. Processing then continues at block 1108.

If it is determined at block 1132 that the error signature is not a double checksum error signature, then block 1134 in FIG. 11b is performed. Next block 1144 in FIG. 11b is performed to determine if the error signature is a double data symbol error signature affecting two rows and two columns (e.g., Px=2 and Q0y=2 and Q1y-2). If it is, then block 1146 is performed to pinpoint both symbol error locations using two-dimensional triangulation. At block 1148 it is determined if the result of the triangulation is both known pinned single symbol (SD1) errors. If it is, then processing continues at block 1152. If it is not, then block 1150 is performed and the errors are pinned by saving the location and error type. At block 1152, the Px0, Q0y or Q1y checksums is utilized to correct both erasures and the corrected data is written to memory. Processing then continues at block 1110 in FIG. 11a.

If it is determined at block 1144 that the error signature is not a double data symbol error signature affecting two rows and two columns, then block 1154 is performed to determine if the error signature is a double data symbol error signature affecting one row and two columns (e.g., Px=1 and Q0y=2 and Q1y=2). If it is, then block 1156 is performed to pinpoint both symbol error locations using two-dimensional triangulation. At block 1158 it is determined if the result of the triangulation is both known pinned single symbol (SD1) errors. If it is, then processing continues at block 1162. If it is not, then block 1160 is performed and the errors are pinned by saving the location and error type. At block 1162, the Q0y or Q1y checksum is utilized to correct both erasures and the corrected data is written to memory. Processing then continues at block 1110 in FIG. 11a.

If it is determined at block 1154 that the error signature is not a double data symbol error signature affecting one row and two columns, then block 1164 is performed to determine if the error signature is a double data symbol error signature affecting two rows and one columns (e.g., Px=2 and Q0y=1 and Q1y=1). If it is, then block 1168 is performed to pinpoint both symbol error locations using two-dimensional triangulation. At block 1170 it is determined if the result of the triangulation is both known pinned single symbol (SD1) errors. If it is, then processing continues at block 1174. If it is not, then block 1172 is performed and the errors are pinned by saving the location and error type. At block 1174, the Px0 checksum is utilized to correct both erasures and the corrected data is written to memory. Processing then continues at block 1110 in FIG. 11*a*.

If it is determined at block 1164 that the error signature is not a double data symbol error signature affecting two rows and one column, then block 1166 on FIG. 3*c* is performed. Next, block 1176 in FIG. 3*c* is performed to determine if the error signature is a single DIMM error signature affecting all rows and one column (e.g., Px>2 and Q0y=1 and Q1y=1). If it is, then block 1178 is performed to pinpoint the DIMM location using two-dimensional triangulation. At block 1180 it is determined if the result of the triangulation is both known pinned single DIMM (SD5) error. If it is, then processing continues at block 1184. If it is not, then block 1182 is performed and the DIMM is pinned by saving the location and error type. At block 1184, the Py0 checksum is utilized to correct the erasures and the corrected data is written to memory. Processing then continues at block 1110 in FIG. 11*a*.

If it is determined at block 1176 that the error signature is not a single DIMM error signature affecting all rows and one column, then block 1186 is performed to determine if the error signature is a single DIMM and single DRAM error signature affecting all rows and two columns (e.g., Px>2 and Q0y=2 and Q1y=2). If it is, then block 1190 is performed to attempt correction assuming failure with DIMM (D0$a$, D1$a$, D2$a$,... DF$a$, Q0$a$, Q1$a$, where of Q0y and Q1y is y=a,b). The processing performed by blocks 1190-1198 has been previously described above in reference to FIGS. 7-10. Next block 1192 is performed to locate additional symbol errors Dxa and Dxb pinpointed and corrected with Q0$a$, Q1$a$, Q0$b$ and Q1$b$ RAID-6 algorithm. Block 1193 is performed next to regenerate all syndromes and to check that they are all non-zero.

Block 1194 is then performed to attempt correction assuming failure with DIMM (D0$b$, D1$b$, D2$b$,... DF$b$, Q0$b$, Q1$b$, where of Q0y and Q1y is y=a,b). Next, block 1195 is performed to locate additional symbol errors Dxa and Dxb pinpointed and corrected with Q0$a$, Q1$a$, Q0$b$ and Q1$b$ RAID-6 algorithm. Block 1196 is performed next to regenerate all syndromes and to check that they are all non-zero.

Next, block 1197 is performed to determine if only DIMM a or DIMM b produced all nonzero syndromes. If only DIMM a or DIMM b produced all non-zero syndromes (i.e., the error can be determined to be either DIMM a or DIMM b), then block 1198 is performed to return corrected data associated with all non-zero syndromes by writing the corrected values to memory. Processing then continues at block 1110 in FIG. 11*a*.

If it is determined at block 1197 that both DIMM a and DIMM b produced all nonzero syndromes (i.e., the error could be either DIMM a or DIMM b) then processing continues at block 1188. In addition, if, at block 1186, it was determined that the error signature was not a single DIMM and single DRAM error signature affecting all rows and two columns, then processing continues at block 1188. At block 1188 the error is determined to be an uncorrectable memory error.

Figure 12:
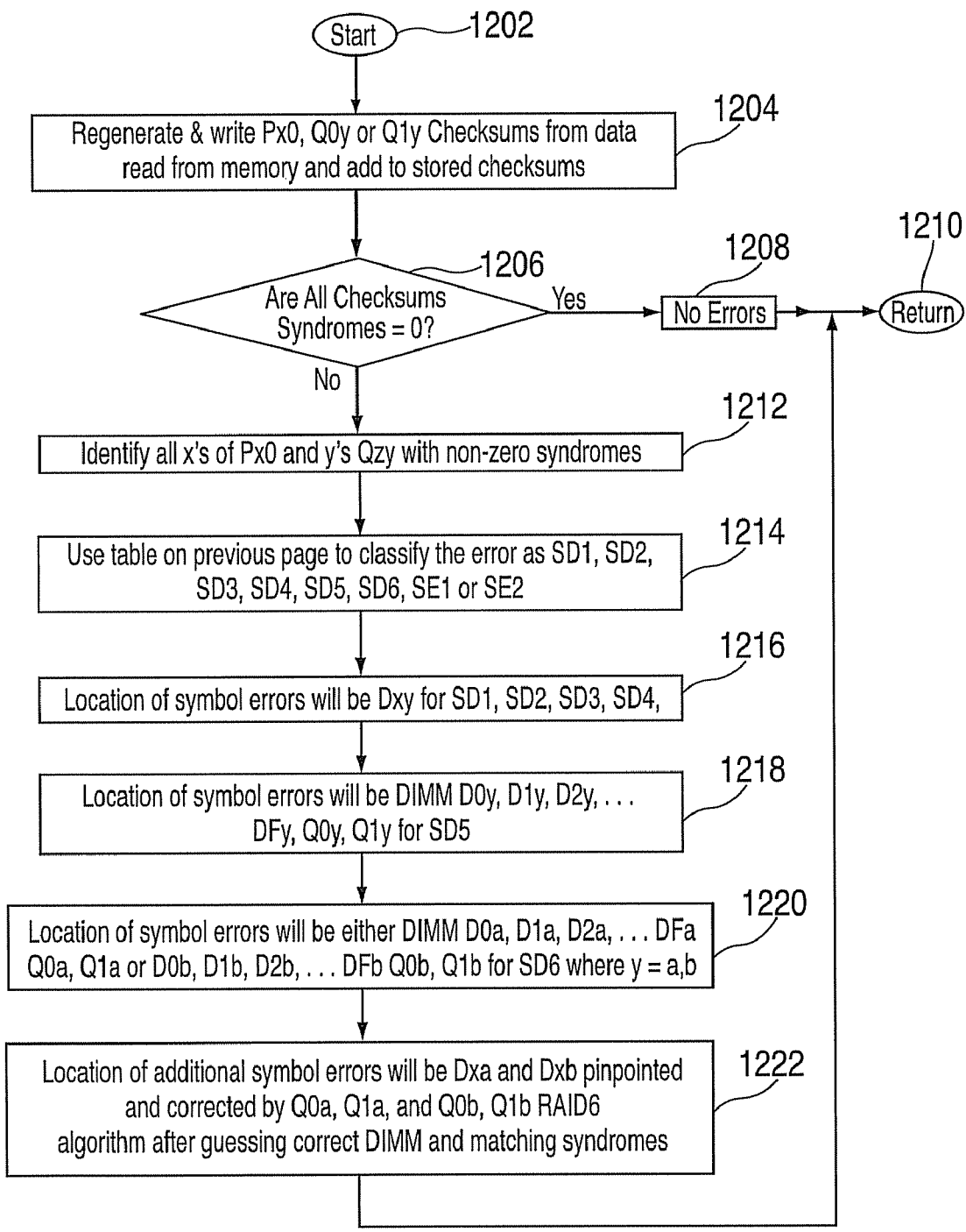
FIG. 12 depicts an exemplary process flow that may be utilized to perform two-dimensional triangulation.

FIG. 12 depicts an exemplary process flow that may be utilized to perform two-dimensional triangulation. The process starts at block 1202. At block 1204, the Px0, Q0y or Q1y checksums are regenerated and written from data read from memory and added to the stored checksums. At block 1206, it is determined if all of the checksum syndromes associated with the data are equal to zero (i.e., the data has no errors). If the data has no error, processing continues at block 1208 with the result "no errors" returned to the requester at block 1210.

If it is determined at block 1206 that the data contains an error, then block 1212 is performed to identify all x's of Px0 and y's of Qzy with non-zero syndromes. At block 1214, the error is classified (e.g., using the table in FIG. 13) as SD1, SD2, SD3, SD4, SD5, SD6, SE1 or SE2. Next, block 1216 is performed and the location of the symbol errors are set to Dxy for errors classified as SD1, SD2, SD3 and SD4. Next, block 1218 is performed and the location of the symbol errors are set to DIMM D0y, D1y, D2y,... Dfy, Q0y, Q1y for an error classified as SD5. Next block 1220 is performed and the location of the symbol errors are set to either DIMM D0$a$, D1$a$, D2$a$,... Df$a$, Q0$a$, and Q1$a$ or D0$b$, D1$b$, D2$b$,... DF$b$, Q0$b$, Q1$b$ for errors classified as SD6, where y=a,b. Next, block 1222 is performed and the location of additional symbol errors are set to Dxa and Dxb pinpointed and corrected by Q0$a$, Q1$a$, Q0$b$, and Q1$b$ RAID-6 algorithm after guessing the correct DIMM and matching syndromes. Processing then continues at block 1210.

FIG. 13 includes a summary of the error classifications utilized by the processing described in reference to FIGS. 11*a-c* and FIG. 12.

The processing and classifications described herein are exemplary in nature and other processing flows and classifications may be utilized by exemplary embodiments without departing from the scope of the present invention.

In an exemplary embodiment, hub devices may be connected to the memory controller through a multi-drop or point-to-point bus structure (which may further include a cascade connection to one or more additional hub devices). Memory access requests are transmitted by the memory controller through the bus structure (e.g., the memory bus) to the selected hub(s). In response to receiving the memory access requests, the hub device translates the memory access requests to control the memory devices to store write data from the hub device or to provide read data to the hub device. Read data is encoded into one or more communication packet(s) and transmitted through the memory bus(ses) to the memory controller.

In alternate exemplary embodiments, the memory controller(s) may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed links to connect to one or more hub chips and/or memory devices.

The memory modules may be implemented by a variety of technology including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. The DIMM depicted in FIG. 1 includes 168 pins in the exemplary embodiment, whereas subsequent DIMMs have been constructed with pincounts ranging from 100 pins to over 300 pins. In exemplary embodiments described herein, memory modules may include two or more hub devices.

In exemplary embodiments, the memory bus is constructed using multi-drop connections to hub devices on the memory modules and/or using point-to-point connections. The downstream portion of the controller interface (or memory bus), referred to as the downstream bus, may include command, address, data and other operational, initialization or status information being sent to the hub devices on the memory modules. Each hub device may simply forward the information to the subsequent hub device(s) via bypass circuitry; receive, interpret and re-drive the information if it is determined to be targeting a downstream hub device; re-drive some or all of the information without first interpreting the information to determine the intended recipient; or perform a subset or combination of these options.

The upstream portion of the memory bus, referred to as the upstream bus, returns requested read data and/or error, status or other operational information, and this information may be forwarded to the subsequent hub devices via bypass circuitry; be received, interpreted and re-driven if it is determined to be targeting an upstream hub device and/or memory controller in the processor complex; be re-driven in part or in total without first interpreting the information to determine the intended recipient; or perform a subset or combination of these options.

In alternate exemplary embodiments, the point-to-point bus includes a switch or bypass mechanism which results in the bus information being directed to one of two or more possible hub devices during downstream communication (communication passing from the memory controller to a hub device on a memory module), as well as directing upstream information (communication from a hub device on a memory module to the memory controller), often by way of one or more upstream hub devices. Further embodiments include the use of continuity modules, such as those recognized in the art, which, for example, can be placed between the memory controller and a first populated hub device (i.e., a hub device that is in communication with one or more memory devices), in a cascade interconnect memory system, such that any intermediate hub device positions between the memory controller and the first populated hub device include a means by which information passing between the memory controller and the first populated hub device can be received even if the one or more intermediate hub device position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include main memory storage devices.

In exemplary embodiments, the memory system includes one or more hub devices on one or more memory modules connected to the memory controller via a cascade interconnect memory bus, however other memory structures may be implemented such as a point-to-point bus, a multi-drop memory bus or a shared bus. Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices, or stubs. However, when used in systems requiring communication with multiple devices or subsystems, this method will often result in significant added component cost and increased system power, and may reduce the potential memory density due to the need for intermediate buffering and/or re-drive.

Although not shown in the Figures, the memory modules or hub devices may also include a separate bus, such as a 'presence detect' bus, an I2C bus and/or an SMBus which is used for one or more purposes including the determination of the hub device an/or memory module attributes (generally after power-up), the reporting of fault or status information to the system, the configuration of the hub device(s) and/or memory subsystem(s) after power-up or during normal operation or other purposes. Depending on the bus characteristics, this bus might also provide a means by which the valid completion of operations could be reported by the hub devices and/or memory module(s) to the memory controller(s), or the identification of failures occurring during the execution of the main memory controller requests.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Memory devices, hubs, buffers, registers, clock devices, passives and other memory support devices and/or components may be attached to the memory subsystem and/or hub device via various methods including solder interconnects, conductive adhesives, socket structures, pressure contacts and other methods which enable communication between the two or more devices via electrical, optical or alternate means.

The one or more memory modules (or memory subsystems) and/or hub devices may be electrically connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc. Electrical interconnections on a memory module are often referred to as contacts, or pins, or tabs. Electrical interconnections on a connector are often referred to as contacts or pins.

As used herein, the term memory subsystem refers to, but is not limited to: one or more memory devices; one or more memory devices and associated interface and/or timing/control circuitry; and/or one or more memory devices in conjunction with a memory buffer, hub device, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry. The memory modules described herein may also be referred to as memory subsystems because they include one or more memory devices and hub devices Additional functions that may reside local to the memory subsystem and/or hub device include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) are attached, or may be mounted to a separate interposer or substrate also produced using one or more of various plastic, silicon, ceramic or other materials which include electrical, optical or other communication paths to functionally interconnect the support device(s) to the memory device(s) and/or to other elements of the memory or computer system.

Information transfers (e.g. packets) along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency(ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency(ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Technical effects and benefits include the ability to run a memory system in an unimpaired state in the presence of a memory module failure occurring coincident with a memory device failure. This may lead to significant improvements in memory system availability and serviceability.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A memory system comprising:
   a memory controller;
   a plurality of memory modules in communication with the memory controller and with a plurality of memory devices;
   a plurality of error codes associated with at least two distinct and functionally unique error checking means, each error code associated with a syndrome and a subset of the memory devices, and at least two of the subsets having memory devices in common with each other; and
   an amalgamating mechanism configured for utilizing at least two non-zero syndromes generated by the distinct and functionally unique error checking means to further extend overall error correction capabilities by enabling additional identification of possible failing memory devices located within intersecting subsets of the memory devices associated with the non-zero syndromes, and for allowing the memory system to continue to run unimpaired in the presence of failing memory devices;
   wherein the plurality of error codes include a RAID-3 error correction code applied to the memory devices organized in a row across multiple memory modules thus spanning a plurality of memory devices across memory modules and a RAID-6 error correction code applied to the memory devices organized in columns across a single memory module thus spanning only one memory module, where only a single data element is shared between any row and column.

2. The memory system of claim 1 wherein a memory module includes one or more memory devices utilized for error detection and correction on the memory module.

3. The memory system of claim 1 wherein substantially all of the memory devices on one of the memory modules are utilized for error detection and correction across the memory modules.

4. The memory system of claim 1 wherein the identification includes the use of triangulation to isolate memory module and memory device failures.

5. The memory system of claim 1 wherein the plurality of memory modules include five memory modules in communication with the memory controller via five different channels, the five memory modules including four memory modules having two memory devices utilized for error detection and correction on the memory module and one memory module having memory devices utilized for error detection and correction across the four memory modules.

6. The memory system of claim 1 wherein an offset multiple shift is used in conjunction with the RAID-6 error correction code to ensure correction does not produce faults that row align and become undetectable.

7. The memory system of claim 1 wherein the mechanical packaging of the memory system is adapted to allow physical removal and substitution of one of the memory modules concurrent with system operation.

8. The memory system of claim 1 wherein the mechanical packaging of the memory system is adapted to allow physical removal and substitution of one or more of the memory devices concurrent with system operation.

9. The memory system of claim 1 wherein the mechanism further detects a failure affecting communication between a memory module and the memory controller possibly coincident with the memory device failure, and the mechanism further allows the memory system to run unimpaired in the presence of the failure affecting communication between the memory module and the memory controller and the memory device failure.

10. The memory system of claim 1, wherein the mechanism is further configured for correcting all single device failures, all single module failures, all double device failures across all memory modules and all module failures occurring in conjunction with a device failure on the same or a different module as well as some device failures exceeding two devices without the need to have prior information about any individual memory device or memory module failure locations.

11. The memory system of claim 1, wherein the mechanism is further configured for isolating one of the memory devices as failing in response to detecting exactly two non-zero syndromes, one of the non-zero syndromes being associated with an error code that spans a plurality of the memory devices across memory modules and the other non-zero syndrome being associated with an error code that spans only one memory module.

12. The memory system of claim 1, wherein the mechanism is further for isolating one of the memory modules as failing in response to detecting at least three non-zero syndromes, two or more of the non-zero syndromes being associated with an error code that spans a plurality of the memory devices across memory modules and exactly one of the non-zero syndromes being associated with an error code that spans only one memory module.

13. The memory system of claim 1, wherein the mechanism is further for isolating one of the memory modules and a memory device on an other of the memory modules as failing in response of detecting exactly two non-zero syndromes each being associated with an error code that spans only one memory module and wherein the system chooses which memory module is the failing one by decoding twice, each time assuming that a given of the two memory modules associated with non-zero syndromes is the failing one.

14. The memory system of claim 1, wherein the mechanism is further for isolating two of the memory devices located on different memory modules as failing in response to detecting at least two non-zero syndromes, two or less of the non-zero syndromes being associated with an error code that spans a plurality of memory devices across memory modules and exactly two of the non-zero syndromes being associated with an error code that spans only one memory module.

15. The memory system of claim 1, wherein the mechanism is further for isolating device failures that can span from one to all of the memory modules as failing in response to detecting non-zero syndromes associated with an error code that spans one to all of the memory modules and exactly two or less of the non-zero syndromes being associated with an error code that spans a plurality of memory devices across memory modules.

16. The memory system of claim 1, wherein there are a plurality of error codes spanning only one memory module, each of the plurality of error codes spanning only one memory module is associated with a different one of the memory modules, at least a portion of each of the plurality of error codes spanning only one memory module is multiplied by a constant that is mutually exclusive across the plurality of error codes spanning only one memory module.

17. The memory system of claim 1, wherein at least one of the error codes spans a plurality of memory devices across memory modules and at least one of the error codes spans only one memory module.

18. A memory controller comprising:
    an interface to a plurality of memory modules, the modules in communication with a plurality of memory devices;
    a plurality of error codes, associated with at least two distinct and functionally unique error checking means, each error code associated with a syndrome and a subset of the memory devices, and at least two of the subsets having memory devices in common with each other; and
    an amalgamating mechanism configured for utilizing at least two non-zero syndromes generated by the distinct and functionally unique error checking means to further extend overall error correction capabilities by enabling additional identification of possible failing memory devices located within intersecting subsets of the memory devices associated with the non-zero syndromes, and for allowing the memory system to continue to run unimpaired in the presence of failing memory devices;
    wherein the plurality of error codes include a RAID-3 error correction code applied to the memory devices organized in a row across multiple memory modules thus spanning a plurality of memory devices across memory modules and a RAID-6 error correction code applied to the memory devices organized in columns across a single memory module thus spanning only one memory module, where only a single data element is shared between any row and column.

19. The memory controller of claim 18 wherein a memory module includes one or more memory devices utilized for error detection and correction on the memory module.

20. The memory controller of claim 18 wherein the identification includes the use of triangulation to isolate memory module and memory device failures.

21. The memory controller of claim 18 wherein the plurality of memory modules includes five memory modules in communication with the memory controller via five different channels, the five memory modules including four memory modules having two memory devices utilized for error detection and correction on the memory module and one memory module having memory devices utilized for error detection and correction across the four memory modules.

22. The memory controller of claim 18 wherein an offset multiple shift is used in conjunction with the RAID-6 error correction code to ensure correction does not produce faults that row align and become undetectable.

23. A method for detecting and correcting errors in a memory system, the method comprising:
    detecting one or more errors in the memory system, the memory system including a plurality of memory modules having memory devices, the memory modules accessed in unison in response to memory commands, the memory system including a plurality of error codes associated with at least two distinct and functionally unique error checking means, each error code associated with a syndrome and a subset of the memory devices, and at least two of the subsets having memory devices in common with each other, the detecting comprising detecting that at least two of the syndromes are non-zero;
identifying the type of errors by intersecting the subsets of the memory devices associated with each of the error codes having a non-zero syndrome to isolate the one or more errors to one or both of a memory device and a memory module; and
correcting the one or more errors using the plurality of error codes while the memory system continues to run unimpaired in the presence of the errors;
wherein the plurality of error codes include a RAID-3 error correction code applied to the memory devices organized in a row across multiple memory modules thus spanning a plurality of memory devices across memory modules and a RAID-6 error correction code applied to the memory devices organized in columns across a single memory module thus spanning only one memory module, where only a single data element is shared between any row and column.

24. The method of claim 23 wherein an offset multiple shift is used in conjunction with the second ECC code to ensure the correcting does not produce faults that row align and become undetectable.

25. The method of claim 23 wherein upon identifying a failing memory module, the identity of the failing memory module is used as a parameter in the plurality of error codes in order to improve reliability of the memory system.

* * * * *